United States Patent
Riesco Cruzat et al.

(10) Patent No.: US 12,438,803 B1
(45) Date of Patent: Oct. 7, 2025

(54) PREFIX ALLOCATION MANAGEMENT FOR NETWORK ROUTERS

(71) Applicant: Amazon Technologies, Inc., Seattle, WA (US)

(72) Inventors: Santiago Riesco Cruzat, Issaquah, WA (US); Zhili Hua, Herndon, VA (US); Siyuan Yu, Chicago, IL (US); Sai Sabarish Kankanvar, Herndon, VA (US); Christopher Winthrop, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 18/622,768

(22) Filed: Mar. 29, 2024

(51) Int. Cl.
*H04L 45/036* (2022.01)
*H04L 45/24* (2022.01)

(52) U.S. Cl.
CPC .......... *H04L 45/036* (2022.05); *H04L 45/245* (2013.01)

(58) Field of Classification Search
CPC ............................ H04L 45/036; H04L 45/245
See application file for complete search history.

(56) References Cited

U.S. PATENT DOCUMENTS

| | | | | |
|---|---|---|---|---|
| 11,159,480 | B2 * | 10/2021 | Gundavelli | H04L 63/168 |
| 2020/0099653 | A1 * | 3/2020 | Strauss | H04L 61/2592 |
| 2024/0129231 | A1 * | 4/2024 | Aggarwal | H04L 45/64 |
| 2024/0196203 | A1 * | 6/2024 | Matsushima | H04L 61/5061 |

OTHER PUBLICATIONS

Andrew Babakian et al. "A Retrospective on Workload Identifiers: From Data Center to Cloud-Native Networks", DOI 10.1109/Access. 2022.3211293, Oct. 2022, 10 pages. (Year: 2022).*

T.T.N. Marks. "Feasibility of ILA as Network Virtualization Overlay in multi-tenant, multi-domain Cloud", University of Amsterdam, NL, System and Network Engineering Department, Jul. 2017, 25 pages. (Year: 2017).*

Tom Herbert and Petr Lapukhov. "Identifier-locator addressing for IPV6", Internet Draft draft-herbert-intarea-ila-01, Mar. 2019, 48 pages. (Year: 2019).*

(Continued)

*Primary Examiner* — G. C. Neurauter, Jr.
(74) *Attorney, Agent, or Firm* — Knobbe, Martens, Olson & Bear, LLP

(57) ABSTRACT

Systems and methods are provided for management of prefix allocation for a user network through distribution of prefixes to one or more virtual interfaces (VIFs) used to support communication of data between the user network and the network service provider. Management resource(s), which may be implemented by components of a network provider or routing resource(s), may be configured to receive the specified intended allocation of prefixes and verify that the intended allocation of prefixes meets at least one operational criterion based on utilization tracking data for prefix availability with respect to the user network. After verification, routing resources may advertise prefixes to a network service provider in accordance with the specified intended allocation of prefixes. The management resources may also update the utilization tracking data in the first data store to reflect allocation of the prefixes.

20 Claims, 7 Drawing Sheets

(56) References Cited

OTHER PUBLICATIONS

Lukasz Makowski and Paola Grosso. "Evaluation of virtualization and traffic filtering methods for container networks", Future Generation Computer Systems 93 (2019), available online Sep. 26, 2018, 13 pages. (Year: 2018).*

"Allowed prefixes interactions," docs.aws.amazon.com, https://docs.aws.amazon.com/directconnect/latest/UserGuide/allowed-to-prefixes.html, retrieved on Jan. 24, 2024 in 3 pages.

"AWS Direct Connect + AWS Transit Gateway + AWS Site-to-Site VPN," docs.aws.amazon.com, https://docs.aws.amazon.com/whitepapers/lastest/aws-vpc-connectivity-options/aws-direct-connect-aws-transit-gateway-vpn.html, retrieved on Jan. 24, 2024 in 3 pages.

"AWS Transit Gateway: Connect Amazon VPCs, AWS accounts, and on-premises networks to a single gateway," aws.amazon.com, https://aws.amazon.com/transit-gateway/#:~:text=AWS%20Transit%20Gateway%20connects%20your.connection%20is%20made%20only%20once, retrieved on Jan. 24, 2024 in 9 pages.

"Connect," docs.aws.amazon.com, https://docs.aws.amazon.com/whitepapers/latest/aws-direct-connect-for-amazon-connect/connect.html, retrieved on Jan. 24, 2024 in 5 pages.

IBM, "Subnet masks (IPv4) and prefixes (IPv6)," ibm.com, https://www.ibm.com/docs/en/ts3500-tape-library?topic=formats-subnet-masks-ipv4-prefixes-ipv6, retrieved on Mar. 25, 2024 in 2 pages.

Nanayakkara, "All about AWS Direct Connect (DX)," Medium.com, https://crishantha.medium.com/all-about-aws-direct-connect-dx-216c21a58812, retrieved on Mar. 25, 2024 in 15 pages.

"Private virtual interface routing example," docs.aws.amazon.com, https://docs.aws.amazon.com/directconnect/lastest/UserGuide/private-transit-vif-example.html, retrieved on Jan. 24, 2024 in 2 pages.

"Routing policies and BGP communities," docs.amazon.com, https://docs.aws.amazon.com/directconnect/lastest/UserGuide/routing-and-bop.html, retrieved on Jan. 24, 2024 in 6 pages.

"Virtual interfaces (VIF)," docs.aws.amazon.com, https://docs.aws.amazon.com/whitepapers/latest/aws-direct-connect-for-amazon-connect/virtual-interface-vif.html, retrieved on Jan. 24, 2024 in 2 pages.

"What is AWS Direct Connect?" docs.aws.amazon.com, https://docs.aws.amazon.com/directconnect.latest/UserGuide/Welcome.html, retrieved on Jan. 24, 2024 in 5 pages.

"What is CIDR?" aws.amazon.com, https://aws.amazon.com/what-is/oidr/, retrieved on Jan. 24, 2024 in 9 pages.

* cited by examiner

PREFIX ALLOCATION MANAGEMENT FOR NETWORK ROUTERS

BACKGROUND

Generally described, computing devices can utilize communication networks to exchange data. Companies and organizations operate computer networks that interconnect a number of computing devices to support operations or provide services to third parties. The computing systems can be located in a single geographic location or distributed across many locations and interconnected using public or private communication networks. Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public. To facilitate increased utilization of data center resources, virtualization technologies allow a single physical computing device to host one or more virtualizations that appear and operate as independent computing devices to users of a data center.

In the context of computer network routing, routing components or routers may support one or more users through virtualization technologies, such as virtual interfaces. Virtual interfaces may be used to support isolated routing domains between networks in communication with the routers. In accordance with data routing or communication protocols, prefixes, representing network addresses, may be advertised by the router for each virtual interface to support routing of data between networks. Prefix allocation may be limited to individual virtual interfaces, which may result in unused routing resources.

BRIEF DESCRIPTION OF THE DRAWINGS

Examples of various inventive features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
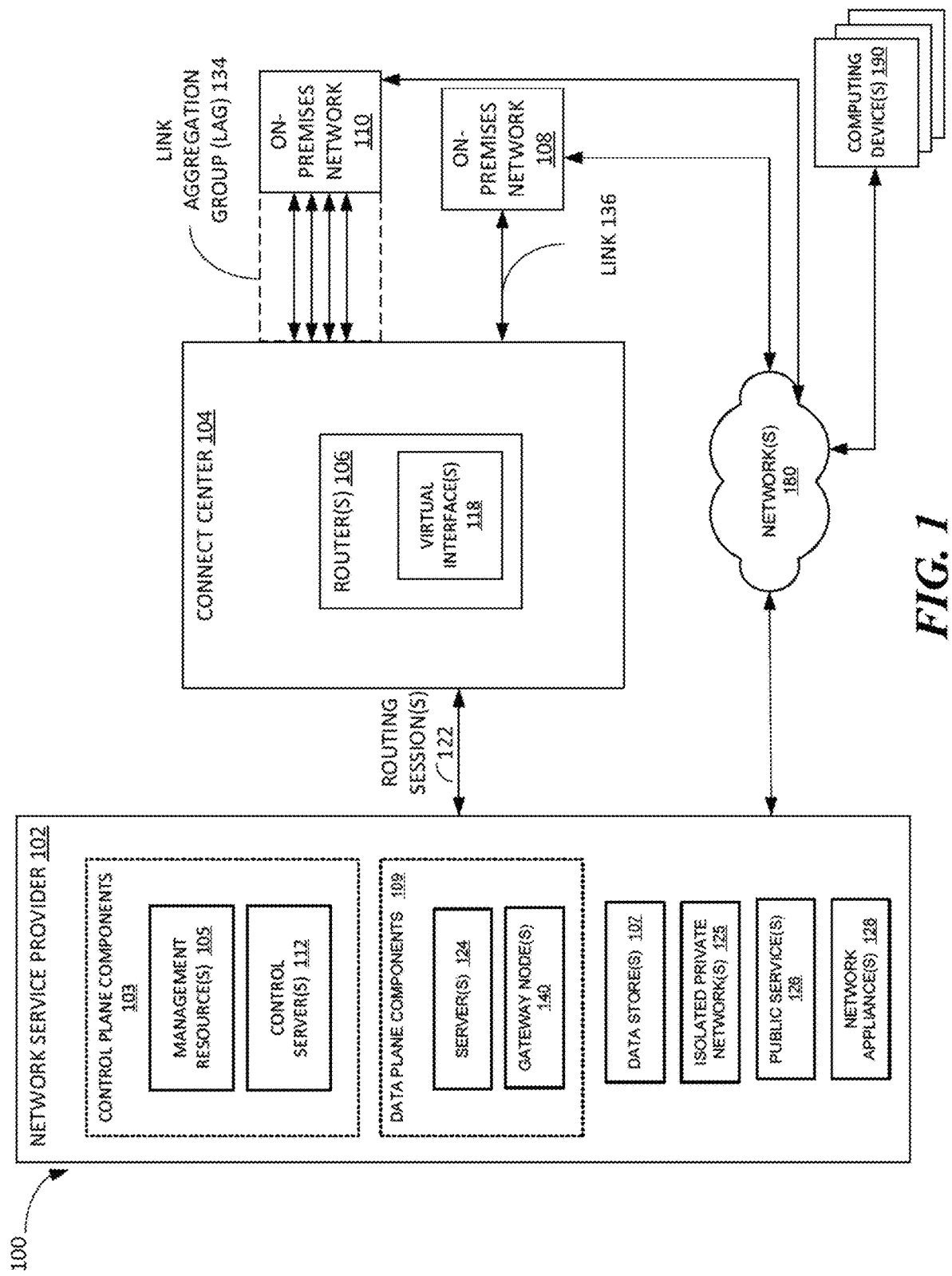
FIG. 1 illustrates an example system for establishing communication between user network(s) and a network service provider through resources of a connect center.

Generally described, one or more aspects of the present application relate to managing routing resources for communication between computing networks. More specifically, aspects of the present application relate to systems and methods for facilitating access, by external entities, to network-based services provided by a network service provider. Illustratively, such network access can include the management of prefix allocation with respect to virtual interfaces supported by one or more routers.

Generally described, prefixes represent one or more network addresses, such as numeric labels assigned to computing devices communicating in accordance with the Internet Protocol to communicate (e.g., IP addresses). Routing resources (e.g., generally referred to as "routers") may advertise prefixes to share routing information between routers in different networks. Advertisement of a prefix may inform other routers that device(s), service(s), or other resource(s) may exist at a particular range of network addresses and provides a way to reach these device(s), service(s), or other resource(s). For example, advertised prefixes may convey routing policies which may influence selection of routes to device(s), service(s), or other resource(s) represented by the advertised prefixes. Illustratively, there may be an overall network traffic policy for routes entering a network where certain routes to a service are preferred. The advertised prefixes may mark these routes as preferred to increase the amount of data travelling on this path.

In some aspects, a connect center including one or more routing resource(s) may be in communication with a network service provider and one or more entities. The entities may include, but are not limited to, administrators, user networks, tenants for multi-tenanted devices, the like, or some combination thereof. The connect center may include an association of physical routing resources and may facilitate direct connections, such as through fiber optic cables between one or more user network(s), which may correspond to an entity or entities, and a network service provider. Communication between the user network(s) and the network service provider may be supported by one or more virtual interface(s) (VIF(s)). VIF(s) may be sub-interfaces supported by routing resources that may be used to support routing sessions, such as routing sessions in accordance with border gateway protocol (BGP) sessions.

Additionally, direct connections, such as those facilitated by the connect center, may be defined in terms of link(s) and LAG(s), where a link may represent a physical ethernet connection and a LAG may represent a group of links. One or more virtual local area networks (VLAN(s)) may be configured on link(s) or LAG(s).

Routing resource(s) may have defined limits in terms of the number of links or LAGs that can be supported. The defined limits may be described in terms of a number of prefixes. Illustratively, each link may be able to support advertisement of a specific number of prefixes and attempting to exceed the specific number of prefixes may exceed the defined limits of the routing resources. Exceeding the defined limits of the routing resources may cause the routing resources to fail. Illustratively, routing session(s) supported by the routing resource(s) may fail.

Existing techniques attempt to implement some form of routing management by limiting the number of prefixes that may be allocated to each VIF according to a maximum, default value. The default value may be lower than desired for some entities. By way of illustrative example, a service of a network service provider may be assigned a range of network addresses. However, this range may not be contiguous. Accordingly, a single prefix may not be used to represent the non-contiguous range. Instead, multiple prefixes may be used to represent the non-contiguous range. Illustratively, the non-contiguous range may need to be divided into multiple contiguous groupings. Each contiguous grouping may then be represented by a single prefix. In some situations, an administrator for an entity may want to have all the prefixes of the non-contiguous range allocated to the same VIF because they correspond to the same service. However, the number of prefixes may exceed the maximum, default value for a VIF. This may cause the administrator not to be able to allocate the prefixes to a single VIF. Instead, the administrator may need to allocate the prefixes to multiple VIFs. Alternately, the administrator may omit prefixes representing the service. This may increase complexity in managing routes between the user network corresponding to the entity and the service.

However, as discussed above, the entity may be associated with a link between a user network corresponding to the entity and the connect center, where the link corresponds to an apportionment of routing resources of the connect center. Illustratively, the link may represent a physical ethernet connection between routers of the user network and the connect center. The link may be able to support a maximum number of VIFs at the default value. While the administrator of the entity may want to allocate more than the maximum, default number of prefixes to a single VIF, they may not have created the maximum number of VIFs and/or allocated the maximum, default number of prefixes to every VIF supported by the link. In other words, there may be unused routing resources apportioned to the entity that can support the prefixes that the administrator wants to allocate to the single VIF.

Unfortunately, under the typical existing systems, it is not possible for the administrator of an entity to allocate prefixes to a single VIF in excess of the default value. If the administrator chooses to omit prefixes in excess of the maximum, default value of prefixes, this may result in apportioned routing resources remaining unused, which can be further inefficient when considering that the total number of routing resources have otherwise been paid for by the entity or cannot be apportioned by the network service provider to another entity.

Aspects of the present disclosure address the deficiencies described above with respect to existing techniques by providing an allowed number of prefixes for each link and/or LAG. An entity may then specify intended prefix allocations to one or more VIF(s) based on the allowed number of prefixes. As discussed above, a VIF may be a sub-interface supported by routing resources. The routing resources may use the VIF to isolate communications between a user network, which may correspond to an entity, and a network service provider. An individual VIF may be allocated the allowed number of prefixes for a link. With reference to the illustrative example above, this allows an administrator of the entity to specify an intended prefix allocation to a single VIF up to the amount that can be supported by routing resources apportioned to the entity. This mitigates the risk of routing resources remaining unused when they have otherwise been paid for by, or apportioned to, the entity and thereby improves efficiency in use of routing resources both for the entity and for the connect center as a whole.

In some aspects, the connect center may communicate with a computing device associated with a specific entity. Management resource(s) of the network service provider and/or the connect center may generate interfaces configured to receive specification of intended prefix allocations for VIF(s) corresponding to the entity. Management resource(s) may be computing resources (e.g., laptops, smartphones, desktop computers, servers, software applications, etc.) that provide routing-related instructions and data (e.g., route tables, routing resource distribution, etc.). In further aspects, management resource(s) may be part of control plane components of a network service provider. As will be discussed in more detail below, control plane components may implement various administrative operations.

Accordingly, management resource(s) may provide interfaces for receiving user input relating to prefix allocation to one or more VIF(s). The interfaces may include at least one of, but are not limited to, an application program interface (API), a software development kit (SDK), a command line interface, a graphical user interface, another type of interface, or some combination thereof. In one example, management resource(s) may generate and provide a graphical user interface to receive specification of intended prefix allocations to one or more VIF(s) for the entity. By way of illustration, an administrator for an entity may access an interface through one or more user device(s) to provide user input including specification of intended prefix allocations to one or more VIF(s) for a user network corresponding to the entity. On receipt of the user input, the interface may generate a configuration request including the intended prefix allocations, which may then be accessed by the connect center. The connect center may advertise the prefixes with routing resources, as specified in the configuration request. The prefixes may then be used in routing data packets between the user network corresponding to the entity and network service provider.

Increasing control of prefix allocation to VIF(s) by the entity may increase a risk of failure of a routing session. As an example, for LAGs, an individual VIF may be allocated up to the allowed number of prefixes for an individual link of the group of links. An entity (e.g., an administrator for an entity) may be able to specify intended prefix allocation to one or more VIF(s) for a user network corresponding to the entity, where the number of prefixes in the specification is equal to the number of links in the LAG times the allowed number of prefixes for each link. However, if an individual VIF is allocated more than the allowed number of prefixes for an individual link, the routing session may fail.

To mitigate this risk, aspects of the present disclosure may verify that intended prefix allocations to VIFs for a user network corresponding to the entity meets operational criteria. Operational criteria may apply thresholds based on prefix utilization data. Prefix utilization data may also include router feedback on resource usage, such as prefixes in use by link(s) for the user network. Prefix utilization data may further include data relating to network parameters (e.g., connection speed, network stability, and the like) for the user network, for the network service provider, or for the one or more links. Additionally, prefix utilization data may include utilization tracking data, where utilization tracking data may include, but is not limited to, data on prefix utilization states. Prefix utilization states may represent a number of prefixes allocated to VIF(s) for a user network, a number of prefixes in use by link(s) for a user network, a number of prefixes for which an entity has previously specified an intended allocation to one or more VIF(s), a number of prefixes for which the entity has not yet specified an intended allocation, and the like. Operational criteria may include, but are not limited to, thresholds related to various prefix utilization states. Operational criteria may also include other thresholds, such as a number of prefixes that may be allocated to an individual VIF. Illustratively, an individual link may be allowed five thousand prefixes. Operational criteria may limit an individual VIF to five thousand prefixes, the number of prefixes allowed for an individual link.

The present disclosure will now be described with reference to the accompanying figures, wherein like numerals refer to like elements throughout. The following description is merely illustrative in nature and is in no way intended to limit the disclosure, its application, or uses. It should be understood that steps within a method may be executed in different order without altering the principles of the present disclosure. Furthermore, the devices, systems, and/or methods disclosed herein can include several novel features, no single one of which is solely responsible for its desirable attributes, or which is essential to practicing the devices, systems, and/or methods disclosed herein. Additionally, while the present disclosure has used various terminology with respect to distributing prefixes, such as 'apportioned' with respect to routing resources, 'allowed,' with respect to for links and LAGs, and 'allocated' with respect to VIFs, this is not intended to be limiting. One skilled in the relevant art will appreciate that the illustrative labels are not limited to the described examples and that the labels should not be construed as limiting.

FIG. 1 illustrates an example system 100 for establishing communication between user networks, such as on-premises network 108 and/or on-premises network 110, and a network service provider 102 through resources of a connect center 104. Each of on-premises networks 108 and 110 may correspond to an entity, such as administrator(s), user network(s), tenant(s) for a multi-tenanted device the like, or some combination thereof. For example, router(s) 106 may be multi-tenanted devices. In further examples, on-premises networks 108 and 110 may correspond to the same tenant for router(s) 106. As another example, on-premises networks 108 and 110 may correspond to different tenants for router(s) 106.

Entities may maintain their own networks, such as private data centers, also referred to herein as "on-premises networks." In some examples, entities may connect their user networks (e.g., on-premises network 108, on-premises network 110, etc.) to the shared network infrastructure of a network service provider 102 over a direct physical link (e.g., a "direct connection"), through a virtual local area network (VLAN), through an SD-WAN, through a virtual private network ("VPN") tunnel, or the like.

For example, on-premises network 108 may communicate with connect center 104 through link 136. In some examples, link 136 may represent a physical link which may have configured on it at least one VLAN. On premises network 110 may communicate through link aggregation group (LAG) 134, where LAG 134 may represent a group of physical links which may have configured on them one or more VLANs. In some examples, entities corresponding to user network(s) (e.g., on-premises network 108, on-premises network 110, etc.) may communicate with the connect center 104 with an authorized resource, where an authorized resource may be a computing resource represented by a unique identifier of the entity or of user network(s) corresponding to the entity. The unique identifier may represent, but is not limited to, a physical link (e.g., an ethernet connection), a VLAN, a virtual interface, a random number unique to an entity, a random number unique to a user network, information corresponding to prefix utilization data, the like, or some combination thereof. In some examples, the computing resource may be part of the user network. However, the computing resource may be separate from the user network. For example, a computing device 190 may communicate with network service provider 102 through network(s) 180. Any of computing device(s) 190 may be an authorized resource for a user network (e.g., on-premises network 108, on-premises network 110, etc.). The components in FIG. 1 may correspond to logical components or functionality that may be implemented in various manners. This can include the incorporation or integration of the illustrated components with additional components, the combination of components and the like.

Connect center 104 may route data between on premises networks (e.g., on premises network 108, on-premises network 110, etc.) and network service provider 102 using one or more router(s) 106. Connect center 104 may be a physical location including router(s) 106. Router(s) 106 may support a VLAN connection to the on-premises network and a VLAN connection to at least one network service provider router. The router(s) 106 may support a VLAN connection to at least one on-premises network router and a VIF to the network service provider 102, as will be described in more detail below.

In some non-limiting examples, router(s) 106 may include routers specific to an entity or user network corresponding to the entity ("entity routers" for brevity), routers specific to the network service provider ("network service provider routers" for brevity), or some combination thereof. As another example, the entity routers may be part of a user network (e.g., on-premises network 108, on-premises network 110, etc.). The entity routers and network service provider routers may work together to advertise prefixes in accordance with intended allocations to one or more VIFs, where the intended allocations are provided by the entity (e.g., by an administrator of the entity). Illustratively, the entity routers may advertise the prefixes per the intended allocation provided by the entity, as will be discussed in more detail below. Network service provider routers may then install the received prefixes. Entity routers may also support a VLAN connection to the on-premises network and a VLAN connection to at least one network service provider router. The entity routers may support a VLAN connection to at least one on-premises network router and a VIF to the network service provider 102, as will be described in more detail below.

Connect center 104 may route traffic through router(s) 106 based on one or more route table(s). The route table(s) may specify network addresses (e.g., CIDR ranges, IP addresses, prefixes, etc.) as sources and destinations for data packets passing through router(s) 106. the router(s) 106 may access route tables stored in a separate location, such as network service provider 102.

Router(s) 106 in connect center 104 may also advertise prefixes associated with one or more user networks. For example, router(s) 106 of connect center 104 may forward traffic between user network(s) (e.g., on-premises network 108, on-premises network 110, etc.) and network service provider 102 through one or more virtual interface(s) 118. Generally described, network addresses, such as IP addresses, are defined as a series of fixed number of numerical digits. Each individual IP address illustratively has two portions, a network address portion corresponding to a series of numerical digits pointing to the network's unique identifier and a host address portion corresponding to a series of numerical digits indicating the host or individual device identifier on the network. One illustrative approach to specifying IP addresses includes Classless or Classless Inter-Domain Routing (CIDR) addresses that use variable length subnet masking (VLSM) to alter the ratio between the network and host address bits in an IP address. A subnet mask is a set of identifiers that returns the network address's value from the IP address by turning the host address into zeroes. Each subnet can have a flexible host count and a limited number of IP addresses. A CIDR IP address appends a suffix value stating the number of network address prefix bits to a normal IP address (e.g., an IPv4 address, an IPv6 address, etc.). For example, 192.0.2.0/24 is an IPv4 CIDR address where the first 24 bits, or 192.0.2, is the network address. As another example, 2002:0ab4:dbca:0014:0000:0000:0000:0000 is an IPv6 CIDR address where the first 48 bits, or 2002:0ab4:dbca, is the network address, and the 49th-64th bits, are the subnet address. The network address and the subnet address together form the prefix for the IPv6 CIDR address.

Prefixes are represented in CIDR notation, and often represent a range of network addresses. CIDR notation includes a prefix, a dividing character (e.g., a slash "/"), and a number representing the length of the prefixes in bits. Illustratively, if the number is 24, then the first 24 bits of an IPv4 address within the CIDR range may represent a network and the remaining 8 bits may represent a device or service within that network. Virtual interfaces (VIFs) may be used for logical segmentation of resources by router(s) 106. Each router 106 may support multiple VIFs 118, where communication through each VIF to the network service provider 102 may be isolated with respect to other VIFs supported by that router 106. As will be discussed in more detail below, the type of VIF used may depend on the destination network component of network service provider 102.

Turning to components of network service provider 102, network service provider 102 may include control plane components 103, data plane components 109. Control plane component(s) 103 and data plane components 109 may be used in routing traffic to and from other components of the network service provider 102 including, but not limited to, data store(s) 107, isolated private network(s) 125, public service(s) 126, and network appliance(s) 128.

The traffic and operations of the network service provider 102 may broadly be described in accordance with types of interactions or functionality, such as control plane traffic carried over a logical control plane and data plane operations carried over a logical data plane. While the data plane represents the movement of user data through the distributed computing system, the control plane represents the movement of control signals through the distributed computing system. Control plane traffic and data plane traffic may be sent over separate/distinct networks. In some examples, control plane traffic and data plane traffic can be supported by different protocols. In some examples, messages (e.g., packets) sent over the provider network include a flag to indicate whether the traffic is control plane traffic or data plane traffic. In some examples, the payload of traffic may be inspected to determine its type (e.g., whether control or data plane type). Other techniques for distinguishing traffic types are possible.

Control plane functionality or logic generally includes one or more control plane components 103 distributed across and implemented by one or more control servers 112. Control plane traffic generally includes administrative operations, such as establishing isolated virtual networks for various clients, monitoring resource usage and health, identifying a particular host or server at which a requested compute instance is to be launched, provisioning additional hardware as needed, and so on. Data functionality or logic generally includes one or more data plane components 109 distributed across and implemented by one or more data plane servers. The data plane includes client resources that are implemented on the network service provider 102 (e.g., computing instances, containers, block storage volumes, databases, file storage, etc., as described in greater detail below). Data plane traffic generally includes non-administrative operations such as transferring data to and from the client resources.

As illustrated, the data plane components 109 can include one or more server(s) 124. The server(s) 124 may support services of the network service provider 102, such as public service(s) 126. The server(s) 124 may also support storage, such as persistent data storage for components of the network service provider 102 and software to manage the storage. In some examples, the data plane may include one or more gateway nodes 140 for routing data packets through the network service provider 102 from sources to destinations. A gateway node 140 may be implemented on a device (e.g., router, server, etc.) or set of devices separate from storage servers and compute servers of the data plane component 109. In some examples, a gateway node 140 may share one or more virtualized servers with storage or compute servers. In some examples, gateway nodes 140 or certain modules or components thereof may be part of the control plane such that they are control plane components 103.

Turning to control plane components 103, certain control plane components 103 may be implemented on a separate set of servers from the data plane components 109, while other control plane components 103 may share virtualized servers with data plane components 109. Resources of the control plane can be provisioned in an account (or accounts) of the network service provider, while resources of the data plane can be provisioned in respective user accounts. In some examples, resources of the data plane may be provisioned in router(s) 106 of the connect center.

As illustrated in FIG. 1, in some examples, the management resource(s) 105 may be part of the control plane components 103. The management resource(s) 105 may provide the route table(s) to the routers 106 (e.g., through a wireless or wired connection). While FIG. 1 illustrates the management resource(s) 105 as part of the network service provider 102, this is not intended to be limiting. In some examples, at least some of the management resource(s) 105 and/or the functionalities of the management resource(s) 105, as will be described in more detail in FIGS. 2-7, may be carried out by router(s) 106. For example, router(s) 106 may generate and/or store the route table(s). In further examples, each router 106 may generate route table(s) with separate management resources (e.g., management node 611 of FIG. 6).

Returning to the connect center 104, the connect center 104 may support multiple different types of VIFs 118 including, but not limited to, VIFs identified as public VIFs or private VIFs. Different types of VIFs may be used to connect to different components of network service provider 102, as described above. One type of VIF can include public VIFs. Public VIFs may access network components of network service provider 102 with public IP addresses. Network components with public IP addresses may include, but are not limited to, public-facing services 126, data stores 107, and other like components of network service provider 102. Another type of VIF may include private VIFs, which may be used to access resources of network service provider 102 with private IP addresses, such as network appliance(s) 128 or isolated private network(s) 125. In some examples, private VIFs may facilitate routing to network components through gateways, such as gateway node(s) 140, described above.

An isolated private network may be used within the network service provider 102 to provide a secure service and a private IP address may be used to access that service. As used herein, the term "virtual private cloud network environment" (sometimes shortened to "virtual private cloud" or simply "VPC") generally refers to an instantiated, virtualized network environment, in which a collection of computing devices is enabled, for example, by a substrate network (e.g., a physical network), to communicate, including for example as if the collection of computing devices existed within a local area network (LAN) environment. Accordingly, the logical representation of devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the VPC in accordance with the logical representation that a LAN environment exists. VPCs provide many advantages over traditional LANs, in that the configuration of computing devices can be changed dynamically, via software, without changing a physical configuration of devices.

VIFs may help support routing sessions, such as routing session(s) 122. In some examples, the routing sessions may be border gateway protocol (BGP) peering sessions. For example, each public or private VIF may be part of a BGP peering session on router(s) 106 in connect center 104. Alternately, each public or private VIF may be part of a border gateway protocol peering session as a peer for a user network (e.g., on-premises network 108, on-premises network 110, etc.). One skilled in the relevant art will appreciate that network implementations can include any combination of different types of VIFs and can omit types of VIFs.

In some examples, an on-premises network (e.g., on-premises network 108, on-premises network 110, etc.) may provide a connection configuration request to the connect center 104 (e.g., to the router(s) 106) including a planned routing method. For example, the connection configuration request may include an intended allocation of each prefix to specified VIF(s) for advertisement by a BGP peer(s) within the specified VIF(s). VIF(s) may advertise their intended prefix allocations once a routing session 122 has been established.

The connection configuration request may be accessed by management resource(s) 105. For example, the connection configuration request may be stored in the data store(s) 107 and later accessed by management resource(s) 105. Additionally, or alternatively, connection configuration requests may be accessed by on-premises networks (e.g., on-premises network 108, on-premises network 110, etc.). For example, connect center 104 may relay communications from an on-premises network (e.g., on-premises network 108, on-premises network 110, etc.) to management resource(s) 105, such as through fiberoptic cables, or the like. The intended prefix allocations may not include certain types of VIFs. For example, in one example, a connection configuration request may include intended prefix allocations for only private VIFs. The management resource(s) 105 may create VIF(s), update prefix allocations between existing VIF(s) (e.g., to correspond with intended prefix allocations), and/or remove VIF(s) based on the connection configuration request.

Connect center 104 may be one of several network locations linking users to the network service provider 102 and may be co-located at other network provider facilities (e.g., Internet service providers, telecommunications providers). Each region can operate multiple connect centers for redundancy. Network service provider 102 may deliver content from points of presence outside of, but networked with, these regions by way of edge locations and regional edge cache servers (points of presence, or "PoPs"). In some implementations, the network service provider 102 can include one or more cellular networks managed and provided by network service provider 102, which can include access points at a user's premises, and which can use in-region resources to run various parts of the network. Users can connect their premises to one another using the disclosed cloud WAN service via connect centers (e.g., connect centers 104), cloud-provided cellular networks, and/or edge locations. The connect centers 104 may include a management resource(s), such as management resource(s) 105 of FIG. 1.

The management resource(s) 105 may facilitate allocation of prefixes by an entity corresponding to the user network (e.g., by an administrator for the entity), as will be described in more detail in FIGS. 2-7, below. Network service provider 102 may provide clients with access to shared, geographically-dispersed network infrastructure. Virtualized compute instances, distributed storage systems, isolated private networks (e.g., VPCs), and the like may be hosted within the shared network infrastructure.

Figure 2:
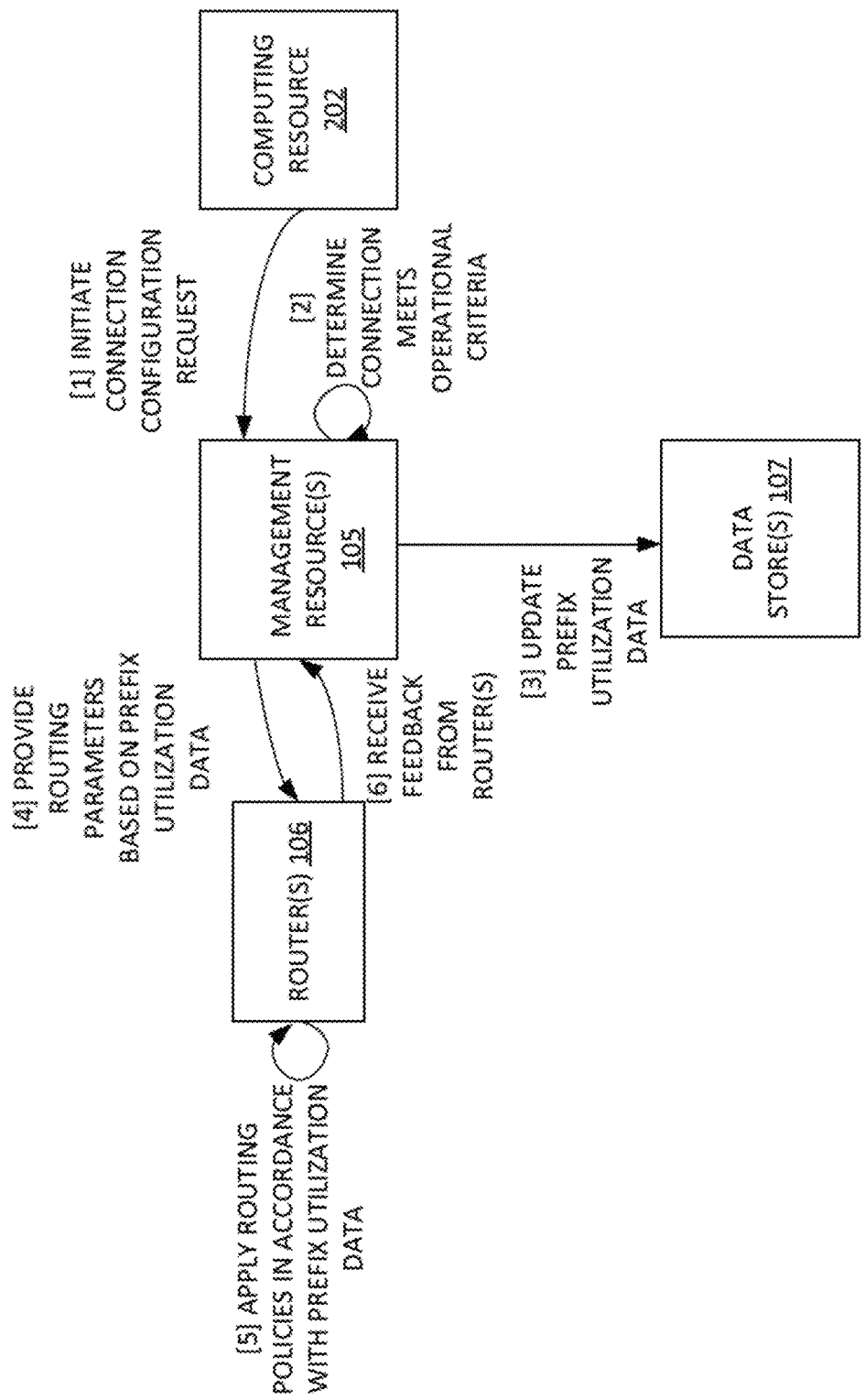
FIG. 2 illustrates a portion of the system of FIG. 1 and illustrates example interactions between management resources and a computing resource during communication of intended prefix allocations to one or more VIF(s) for a user network.

FIG. 2 illustrates a portion of the system of FIG. 1 and illustrates example interactions between management resource(s) 105 and a computing resource 202 during communication of intended prefix allocations to one or more VIF(s) for a user network. The computing resource 202 may be, but is not limited to, a laptop, a smartphone, a server, a software application, or some combination thereof. The computing resource 202 may be an authorized resource for a user network. As a reminder, an authorized resource may be any computing resource represented by a unique identifier for the user network or for an entity corresponding to the user network. The computing resource 202 may be part of a user network (e.g., on-premises network 108, on-premises network 110, etc.) Alternately, the computing resource 202 may become an authorized resource for a user network after receipt of user input allowing representation of the computing resource 202 by the unique identifier. For example, a user may access an interface (e.g., one or more APIs, a command line interface, a graphical user interface, etc.) on computing resource 202. To access the interface, the user may need to provide credentials, where the credentials indicate the user is an administrator of the user network or for an entity corresponding to the user network. The user's provision of credentials through the computing resource 202 may allow representation of the computing resource 202 by the unique identifier for the user network or for an entity corresponding to the user network.

At [1], computing resource 202 may provide a connection configuration request to management resource(s) 105. In some examples, the computing resource 202 may transmit the connection configuration request directly to the management resource(s) 105. By way of illustration, computing resource 202 may provide the connection configuration request via an interface (e.g., an API, an SDK, a GUI, the like, etc.) through a network, such as network 180 of FIG. 1. The connection configuration request may include intended prefix allocation by an entity to one or more VIF(s) for a user network corresponding to the entity. For example, the computing resource 202 may store the message in a data store accessible to management resource(s) 105, such as data store(s) 107. The management resource(s) 105 may then transmit the connection configuration request to connect center 104. Illustratively, the management resource(s) 105 may transmit the connection configuration request to router(s) 106 of connect center 104.

As another example, computing resource 202 may transmit the connection configuration request to connect center 104, which may handle connection configuration requests with management resource(s) 105. Illustratively, in some examples, management resource(s) 105 may be part of connect center 104. On receipt of the connection configuration request, management resource(s) 105 may transmit the connection configuration request to router(s) 106.

As a further example, computing resource 202 may transmit the prefix utilization data including intended prefix allocations by an entity to management resource(s) 105 without using a connection configuration request. For example, several service(s), such as API(s), may be called as prefix utilization data is modified and provide the prefix utilization data to management resource(s) 105, as will be discussed in more detail with reference to FIG. 5

While management resource(s) 105 is illustrated as separate from router(s) 106, this is not intended to be limiting. As discussed above, functionalities described herein with respect to management resource(s) 105 may be carried out by components of distributed computing resources. For example, functionality of management resource(s) 105 may be implemented by components of the network service provider 102 (e.g., control plane components 103), components of the router(s) 106, other components of connect center 104, or some combination thereof.

At [2], the management resource(s) 105 may determine whether the connection meets operational criteria. Operational criteria may be thresholds set in order to mitigate the risk of communication failures between the computing resource 202 and network service provider 102. The operational criteria may be stored in a connect center, such as connect center 104 of FIG. 1. The operational criteria may be set by an administrator of the connect center 104. For example, an administrator may determine operational criteria configured to mitigate failures in communication of data between computing resource 202 and network service provider 102. These may include operational criteria configured to mitigate failures in routing sessions (e.g., BGP routing sessions). For example, advertisement of prefixes beyond a threshold for a router may cause a routing session to fail. So, operational criteria based on prefix utilization status, such as those described below, may mitigate this risk. Operational criteria may be based on, but are not limited to being based on, network parameters (e.g., connection speed, connection stability, etc.) or prefix utilization data, where prefix utilization data may include values corresponding to various prefix utilization states.

Prefix utilization states may include "allowed," "allocated," "available," or "in use" by way of illustration. However, one skilled in the relevant art will appreciate that the illustrative labels are not limited to the described examples and that the labels should not be construed as limiting. The "allowed" state may correspond to a value for prefixes allowed to a connection (e.g., link(s), LAG(s), etc.) for a user network by management resource(s) 105. The upper limit may depend on the type of connection (e.g., link, LAG, etc.) between the connect center 104 and a user network (e.g., on-premises network 108, on-premises network 110, etc.). For example, the upper limit may depend on the type of connection between router(s) 106 and entity router(s). As a reminder, entity router(s) may be router(s) of an entity or router(s) of a user network corresponding to the entity. With reference to the illustrative example of FIG. 1, the upper limit for link 136 may be higher or lower than for LAG 134. For example, an individual link may have fewer allowed prefixes than a LAG. As another example, a LAG may be allowed the same value of prefixes as an individual link regardless of the number of members that comprise the LAG. By way of illustration, a LAG may be allowed fewer prefixes than the sum of prefixes that would be allowed to each of the individual links that comprise that group if each member link had been requested and created individually. In one example, the upper limit for link 136 may be five thousand prefixes. In a further example, the LAG 134 may include four connections, and the upper limit for LAG 134 may be fifteen thousand prefixes.

In some examples, a user network corresponding to an entity may utilize an atypical number of VIFs, which may result in a larger than expected number of allowed prefixes. Illustratively, the entity (e.g., an administrator of the entity) may request an increase to the routing resource(s) apportioned to the entity. The connection (e.g., link(s), LAG(s), etc.) between a user network corresponding to the entity and the connect center 104 may be "allowed" more prefixes. The entity may then be able to provide an intended allocation for a larger number of prefixes to one or more VIF(s). In one example, the entity may be able to provide an intended prefix allocation to more than fifty VIFs. This may result in an "allowed" pool larger than five thousand prefixes. In these cases, the initial pool for the user network is typically the value of all the manually increased prefixes multiplied by the number of allocated VIFs. For example, if a user network has a link with two hundred VIFs and two hundred prefixes per VIF, then that connection's "allowed" pool may be forty thousand prefixes.

In some examples, the "allowed" state may depend on network parameters between the connect center 104 and the user network (e.g., on-premises network 108, on-premises network 110, etc.). Illustratively, the "allowed" state may depend on network parameters between router(s) 106 and routers of the user network. Alternately, the "allowed" state may depend on network parameters between the user network and the management resource(s) 105. For example, of the network parameters fail to meet specified thresholds, the upper limit for the "allowed state" may change. Illustratively, if connection speed between the user network and the management resource(s) 105 is below a threshold, the upper limit may be reduced. For example, operational criteria may indicate that that if the connection speed is five gigabits per second or higher, then the upper limit for the sum of all prefixes advertised by all the BGP peers on all the VIFs (VLANs) on that connection should be five thousand prefixes. However, if the connection speed is lower than five gigabits per second, the upper limit may be reduced. For example, the upper limit may be reduced by the percentage difference between the actual connection speed and the specified connection speed. In one example, the actual connection speed may be four gigabits per second, and the upper limit may be reduced by twenty percent from five thousand prefixes to four thousand prefixes.

In some examples, the maximum allowed prefixes that can be "allowed" can vary depending on the number of physical resources (links) in use by the user. For example, a LAG, such as LAG 134, may be created with a single link as the only member of that LAG and will have a first "allowed" state corresponding to a value for the number of prefixes that is allowed to a single link, and when a second member link is added to the LAG the maximum allowed number of prefixes on that LAG can be increased, resulting in a second "allocated" state.

The "allocated" state may correspond to a value for the number prefixes for which an entity has specified an intended allocation to one or more VIF(s) for a user network corresponding to the entity. The management resource(s) 105 may determine the value corresponding to the "allocated" state from the connection configuration request. For example, the management resources 105 may sum the number of prefixes allocated to or intended for allocation to each VIF in the connection management request to determine the value corresponding to the "allocated" state. The "available" state may correspond to a value for the difference between the value corresponding to the "allowed" state and the value corresponding to the "allocated" state." The "in use" state may correspond to a value for the number prefixes advertised to a specific VIF. Alternately, the "in use" state may correspond to a value for the sum of all prefixes received across all VIFs for a user network.

The management resource(s) 105 may determine operational criteria are met under a variety of circumstances. Situations where the management resource(s) 105 may determine that operational criteria are met include, but are not limited to, when the connection speed is above a threshold, when the value corresponding to an "allocated" state is below the "allowed" state, when the value corresponding to the "available" state is below the "allowed" state, when the value corresponding to the "available" state is a positive value, when the value corresponding to the "in use" state is less than or equal to a number of prefixes for which an entity has specified an intended allocation to at least one VIF, or when the value corresponding to the "in use" state is less than or equal to a number of prefixes allocated to or intended for allocation to all VIFs for a user network.

As discussed above at [1], functionality of the management resource(s) 105 may be carried out by both router(s) 106 and network service provider 102. Illustratively, the router(s) 106 may provide feedback on whether the value corresponding to an "allocated" state indicating a number of prefixes for which an entity has specified an intended allocation to at least one VIF is above an "allowed" state indicating a number of prefixes available for allocation by an entity corresponding to the user network or an administrator for the entity.

At [3], the management resource(s) 105 may update prefix utilization data on data store(s) 107. Prefix utilization data may store network parameters including, but not limited to, connection speed and network stability. Prefix utilization data may also store utilization tracking data, where utilization tracking data includes prefix utilization status for a user network. Prefix utilization status may include, but is not limited to, a value corresponding to the "allowed" state, a value corresponding to an "allocated" state, a value corresponding to an "available" state. In some examples, where the link between the user network, for which computing resource 202 is an authorized resource, and the connect center 104 is a LAG, the prefix utilization status may include a value corresponding to a second "allowed" state, where the second "allowed" state corresponds to a value for the number of prefixes allowed for the LAG.

While FIG. 2 includes storing prefix utilization data in data store(s) 107, this is not intended to be limiting. For example, in some examples, prefix utilization data may be stored on data stores external to network service provider 102. For example, prefix utilization data may be stored in router(s) 106.

At [4], the management resource(s) 105 may provide routing parameters to router(s) 106, based on prefix utilization data. Routing parameters may include instructions on the number of prefixes allowed or the number of prefixes allocated by an entity corresponding to the user network with management resource(s) 105. The routing parameters may additionally, or alternatively, include instructions to advertise prefixes with one or more VIF(s) (e.g., with BGP peers in the VIF(s)) in accordance with the entity's specification of an intended prefix allocations provided in connection configuration request received at [1]. In some examples, management resource(s) 105 may additionally provide prefix utilization data to router(s) 106. In some examples, router(s) 106 may make information received from management resource(s) 105 available to peers within the same routing sessions (e.g., BGP routing sessions). Additionally, or alternatively, router(s) 106 may use the information in generating route tables between resources and or services represented by prefixes advertised in the routing sessions. In some examples, the router(s) 106 may include a management node, which may use the prefix utilization data to determine whether operational criteria are met, as will be discussed in more detail in FIG. 6.

At [5], the router(s) 106 may apply routing policies in accordance with prefix utilization data. The routing policies may determine how data is communicated between the user network, for which the computing resource 202 is an authorized resource, and network service provider 102. As part of implementing the routing policies, router(s) 106 may advertise prefixes in accordance with the entity's intended allocation of prefixes received at [1]. The router(s) 106 may also generate route tables with specified prefixes. Additionally, or alternatively, the router(s) 106 may communicate data in accordance with generated route tables, where the route tables include routes between resources and or services represented by prefixes advertised in the routing sessions. Routes may include inbound and outbound routes including advertised prefixes, where inbound routes communicate information from the network service provider (e.g., network service provider 102 of FIG. 1), and wherein outbound routes communicate information from a user network (e.g., on-premises network 108, on-premises network 110, etc.).

At [6], the management resource(s) 105 may receive feedback from the router(s) 106. The feedback may include usage information with respect to resources apportioned to the user network. The usage data may be considered by management resource(s) 105 as utilization tracking data. For example, the feedback may include the number of prefixes in an "in use" state, as described above with respect to [2]. The feedback may additionally, or alternatively, include failure information. For example, an allowed number of prefixes may be exceeded by application of routing parameters received at [4]. Accordingly, a routing session (e.g., routing session 122 of FIG. 1) may fail. In some examples, failure of a routing session may constitute failure of operational criteria, as will be discussed in more detail in FIG. 3.

Figure 3:
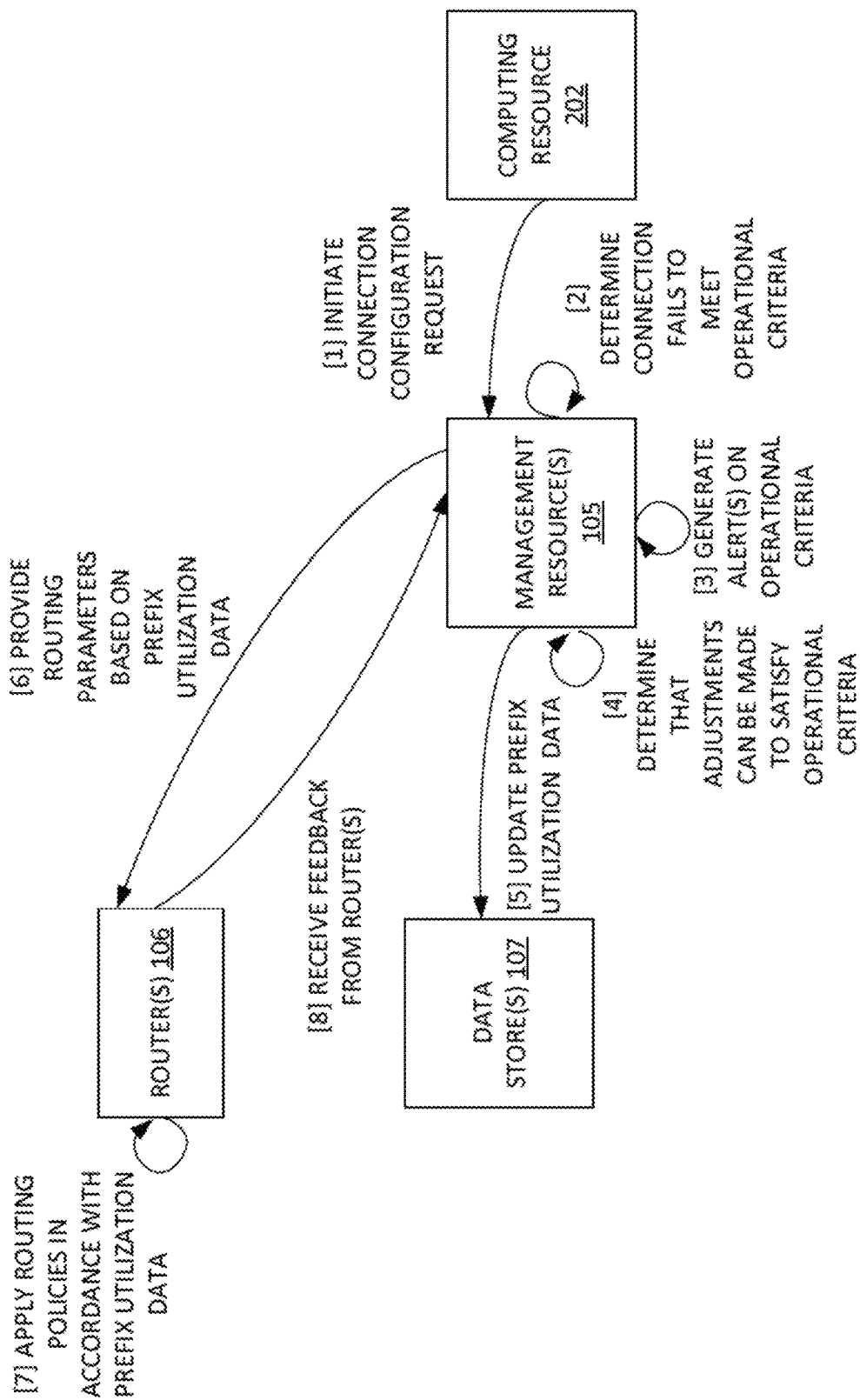
FIG. 3 illustrates example interactions between management resources and a computing resource in accordance with some examples.

FIG. 3 illustrates example interactions between a network service provider 102 and a computing resource 202. Computing resource 202 may be an authorized resource for an entity or for user network (e.g., on-premises network 108, on-premises network 110, etc.), in accordance with some examples. In further examples, the user network may correspond to the entity.

At [1], the computing resource 202 may initiate a connection configuration request. As discussed with respect to FIG. 2, the connection configuration request may include an entity's intended allocation of prefixes to one or more VIF(s) for a user network corresponding to the entity (e.g., on-premises network 108, on-premises network 110, etc.). By way of illustration, computing resource 202 may provide the connection configuration request via an interface (e.g., an API, an SDK, a GUI, the like, etc.) through a network, such as network 180 of FIG. 1. The connection configuration request may include intended prefix allocations by an entity to one or more VIF(s) for the user network corresponding to the entity. For example, the computing resource 202 may store the message in a data store accessible to management resource(s) 105, such as data store(s) 107. The management resource(s) 105 may receive notification from data store(s) 107 or another component (e.g., a communication interface) that a connection configuration request has been received and is stored in data store(s) 107. The management resource(s) 105 may retrieve the connection configuration request from the data store(s) 107 for further processing, such as processing to determine whether the request meets operational criteria.

As another example, computing resource 202 may transmit the connection configuration request to connect center 104, which may handle connection configuration requests with management resource(s) 105. Illustratively, in some examples, management resource(s) 105 may be part of connect center 104. Management resource(s) 105 may then process the connection configuration request, such as by processing the connection configuration request to determine whether the request meets operational criteria. After processing, the management resource(s) 105 may provide the connection configuration request to router(s) 106.

At [2], the computing resource 202 may determine that the connection configuration request fails to meet operational criteria. The management resource(s) 105 may determine operational criteria are not met in a variety of circumstances. For example, management resource(s) 105 may determine operational criteria are not met based on values corresponding to prefix utilization status for a user network (e.g., on-premises network 108, on-premises network 110, etc.). If the management resource(s) 105 determines the value corresponding to the "allocated" state exceeds the value corresponding to the "allowed" state, the management resource(s) 105 may determine that operational criteria are not met.

Additionally, or alternatively, if management resource(s) 105 determine the value corresponding to the "available" state is a negative value, the management resource(s) 105 may determine that operational criteria are not met. In some examples, if the management resource(s) 105 determine that the value corresponding to the "in use" state is greater than an entity's intended prefix allocation to a specified VIF, the management resource(s) 105 may determine than operational criteria are not met. In other examples, if the management resource(s) 105 determine that the value corresponding to the "in use" state is greater than the sum of prefixes for which an entity has specified an intended allocation to one or more VIF(s), then, the management resource(s) 105 may determine that operational criteria are not met. In one example, a connection, such as link 136 may have five thousand prefixes allowed of which an entity, through computing resource 202, has specified an intended allocation of two thousand prefixes to VIF 'A' and one thousand prefixes to VIF 'B.' Each of VIF 'A' and VIF 'B' may have five hundred prefixes in use. For example, five hundred prefixes may be advertised for VIF 'A,' and five hundred prefixes may be advertised for VIF 'B.' Management resource(s) 105 may determine that the prefix utilization status for computing resource 202 is a value of five thousand prefixes corresponding to the "allowed" state, three thousand prefixes corresponding to the "allocated" state, a value of two thousand prefixes corresponding to the "available" state, and a value of one thousand prefixes corresponding to an "in use" state.

As discussed in FIG. 2, the functionality of the management resource(s) 105 may be carried out by components of both router(s) 106 and network service provider 102. For example, some operational criteria checks may be carried out by router(s) 106 and other operational criteria checks may be carried out by components of the network service provider 102 (e.g., control plane components 103). In one example, router(s) 106 may determine whether the value corresponding to the "allocated" state exceeds the value corresponding to the "allowed" state, and components of network service provider 102 may carry out the remaining operational criteria checks.

At [3], the management resource(s) 105 may generate alert(s) on operational criteria. For example, management resource(s) 105 may generate alert(s) on which operational criteria failed. In one example, if a connection configuration request included prefix allocations or intended prefix allocations greater than an upper limit associated with an "allowed" state then the management resource(s) 105 may generate an alert indicating that the upper limit associated with an "allowed" state will be exceeded. As another example, if the connection configuration request included removal of prefixes that were "in use," management resource(s) 105 may generate an alert indicating that the prefixes cannot be removed because they are "in use". In some examples, the management resource(s) 105 may generate more than one alert. Alternately, the management resource(s) 105 may generate an alert indicating failure to meet more than one operational criterion. In some examples, the management resource(s) may also generate recommendations corresponding to the alerts. The management resource(s) 105 may generate an alert indicating that the upper limit associated with an "allowed" state will be exceeded with a recommendation to reduce the number of prefixes allocated or intended to be allocated to the connection configuration request to below the upper limit.

At [4], the management resource(s) 105 may determine that adjustments can be made to satisfy operational criteria that have not been met. Satisfying operational criteria may include achieving compliance with one or more thresholds. To satisfy operational criteria, the management resource(s) 105 may be able to make the adjustments determined at [4] internally. For example, the management resource(s) 105 may determine that a VIF to be removed per the connection configuration request, has "in use" prefixes which cannot be removed. Subsequently, the management resource(s) 105 may reallocate the "in use" prefixes to other VIFs and notify the entity or the user network corresponding to the entity through computing resource 202. Alternately, the management resource(s) 105 may be able to generate options for corrective actions that the computing resource 202 may implement to satisfy operational criteria. For example, management resource(s) 105 may generate a selectable link requesting input on reallocating the "in use" prefixes to existing VIFs. Computing resource 202 may then select the link indicating that they would like to reallocate the prefixes and remove the VIFs they were in previously per the connection configuration request. The management resource(s) 105 may proceed accordingly to reallocate the prefixes. The operational criteria failure may then be resolved, and the management resource(s) 105 may proceed to [5] to update prefix utilization data in data store(s) 107. To review, prefix utilization data may include, but is not limited to data relating to prefix allocations or intended prefix allocations from an allocated pool of prefixes for a user network and utilization tracking data, which may include prefix utilization status as described above with respect to FIG. 2.

Once management resource(s) 105 determine that operational criteria have been satisfied, the management resource(s) 105 may update prefix utilization data on data store(s) 107 at [5]. Prefix utilization data may store network parameters including, but not limited to, connection speed or connection stability. Prefix utilization data may also store prefix utilization status including, but not limited to, a value corresponding to the "allowed" state, a value corresponding to an "allocated" state, a value corresponding to an "available" state. In some examples, where the connection between the computing resource 202 and the network service provider 102 includes a LAG, the prefix utilization status may include a value corresponding to a second "allowed" state, where the second "allowed" state corresponds to a value for the number of prefixes for the LAG.

While FIG. 3 includes storing prefix utilization data in data store(s) 107, this is not intended to be limiting. For example, in some examples, prefix utilization data may be stored on data stores external to network service provider 102. For example, prefix utilization data may be stored in router(s) 106.

At [6], the management resource(s) 105 may provide routing parameters to router(s) 106, based on prefix utilization data. Routing parameters may include, but are not limited to, instructions on the number of prefixes "allowed," to link(s) or LAG(s) for the entity or user network corresponding to the entity, instructions on the number of prefixes "allocated" by the entity to one or more VIF(s) for the user network corresponding the entity, the like, or some combination thereof. The routing parameters may additionally, or alternatively, include instructions to advertise prefixes with one or more VIF(s) in accordance with the entity's intended allocation of prefixes to one or more VIF(s) provided in the connection configuration request received at [1]. In some examples, management resource(s) 105 may additionally provide prefix utilization data to router(s) 106. In some examples, router(s) 106 may make information received from management resource(s) 105 available to peers within the same routing sessions (e.g., BGP routing sessions). Additionally, or alternatively, router(s) 106 may use the information in generating route tables between resources and or services represented by prefixes advertised in the routing sessions. In some examples, the router(s) 106 may include a management node, which may use the prefix utilization data to determine whether operational criteria are met, as will be discussed in more detail in FIG. 6.

At [7], the router(s) 106 may apply routing policies in accordance with prefix allocation(s) or intended allocation(s). The router(s) 106 may advertise prefixes allocated or intended to be allocated to specified VIF(s) in accordance with prefix allocation(s) or intended allocation(s) received from the computing resource 202 at [1] as part of the connection configuration request. The router(s) 106 may generate route tables with specified prefixes. Additionally, or alternatively, the router(s) 106 may communicate data in accordance with generated route tables, where the route tables include routes between resources and or services represented by prefixes advertised in the routing sessions. Routes may include inbound and outbound routes including advertised prefixes, where inbound routes communicate information from the network service provider (e.g., network service provider 102 of FIG. 1), and wherein outbound routes communicate information from a user network (e.g., on-premises network 108, on-premises network 110, etc.).

At [8], the management resource(s) 105 may receive feedback from the router(s) 106. The feedback may include usage information with respect to resources apportioned to an entity or to a user network corresponding to the entity. The usage data may be considered by management resource(s) 105 as utilization tracking data. For example, the feedback may the number of prefixes in an "in use" state, as described above with respect to [2]. The feedback may additionally, or alternatively, include failure information. For example, an allocation of prefixes may be exceeded by application of routing parameters received at [6]. Accordingly, a routing session (e.g., routing session 122 of FIG. 1) may fail.

In some examples, failure of a routing session may constitute failure of operational criteria. For example, feedback from the router may be received by management resource(s) 105 prior to [2]. The router(s) 106 may attempt to implement the routing parameters at [6], which may result in the failure of the routing session (e.g., routing session 122) between the user network, for which the computing resource 202 is an authorized resource, and the network service provider 102. The failure may be relayed back to management resource(s) 105, and the management resource(s) 105 may determine that the operational criteria have failed at [2].

As another example, the router(s) 106 may be part of management resource(s) 105 of FIG. 2. Router(s) 106 may accordingly perform some of the functionality of management resource(s) 105 by performing some of the operational criteria checks, including whether a number of prefixes "allowed" to a connection corresponding to a user network, or "allocated" to one or more VIF(s) for a user network has been exceeded by the implementation of the routing parameters received at [6]. The router(s) 106 may run operational criteria checks prior to or subsequent to implementing the routing parameters. In one example, the router(s) 106 may determine that a number of prefixes allocated to a user network has been exceeded by the routing parameters received at [6] prior to implementation and send a communication to the computing resource 202 that the corresponding operational criteria has failed.

As another example, the router(s) 106 may attempt to implement the routing parameters at [6], which may result in the failure of the routing session (e.g., routing session 122) between the user network, for which the computing resource 202 is an authorized resource, and the network service provider 102. The reason for the failure may be that a number of prefixes "allowed" to a connection for a user network, "allocated" to one or more VIFs for a user network, the like, or some combination thereof, has been exceeded by the implementation of the routing parameters received at [4]. The router(s) 106 may interpret this as a failure of the operational criteria corresponding to exceeding "allowed" prefixes for a connection for a user network, exceeding "allocated" for one or more VIFs for a user network, the like, or some combination thereof, and may determine that the operational criteria have failed at [2].

Figure 4:
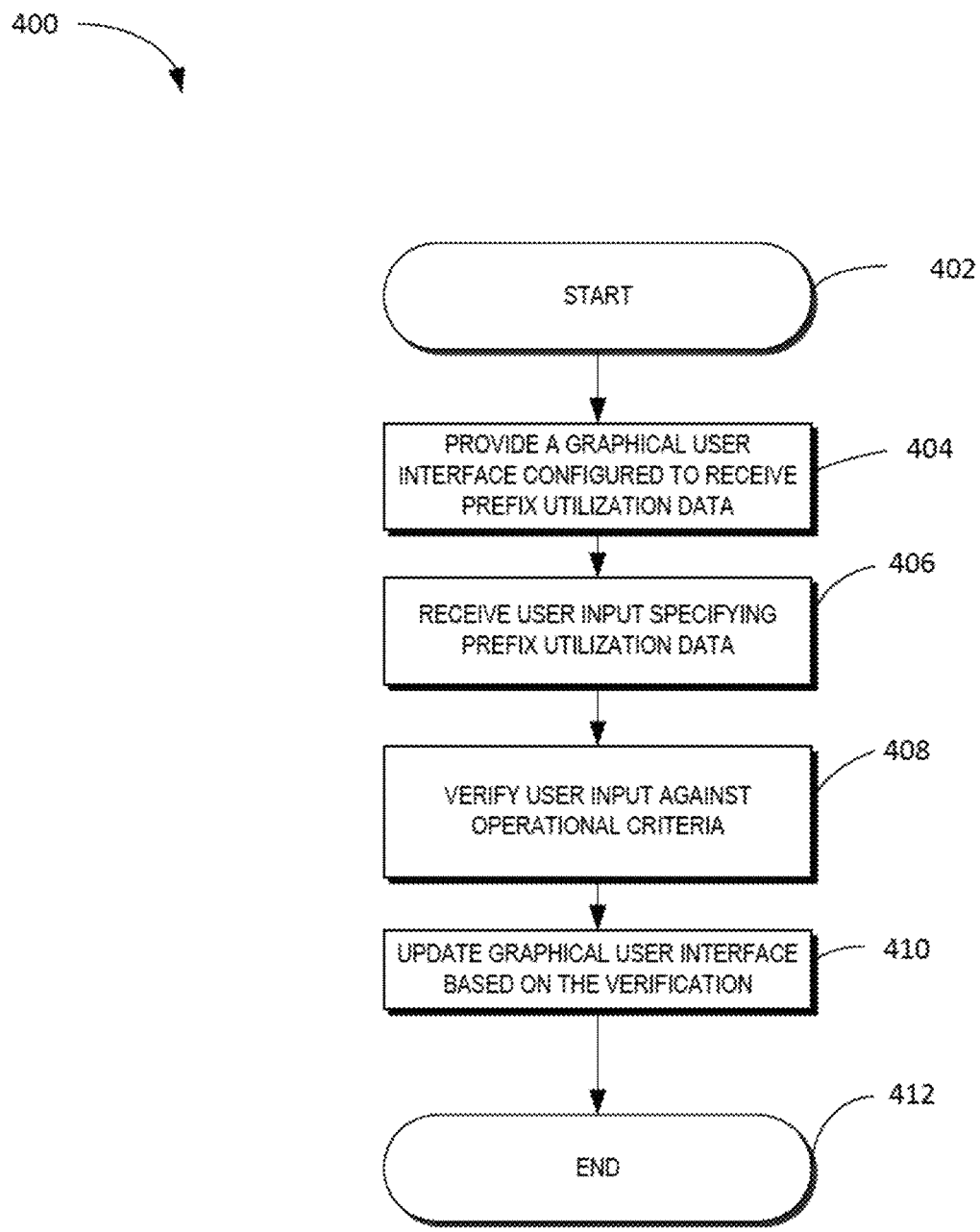
FIG. 4 illustrates an example method for configuration of link(s) between a user network and a connect center to facilitate communication with a network service provider.

FIG. 4 illustrates an example method 400 for configuration of a connection between a user network (e.g., on-premises network 108, on-premises network 110, etc.) and a connect center 104 to facilitate communication with a network service provider (e.g., network service provider 102 of FIG. 1). The method 400 may be performed by management resource(s), such as management resource(s) 105 of FIGS. 1-3. At block 402, management resource(s) may start configuration of the connection, such as for link(s) or LAG(s) forming the connection. To start configuration of the connection, the management resource(s) may generate display information for a graphical user interface configured to receive data, including an intended allocation of prefixes, from an entity corresponding to a user network (e.g., on-premises network 108, on-premises network 110, etc.)

At block 404, the graphical interface may be provided to an entity or an administrator for the entity through a computing device (e.g., computing resource 202), as described above in FIGS. 1-3. The graphical user interface may include one or more pages of display information, where each page may include different information and/or interactive areas. In one example, an entity (e.g., an administrator for the entity) may move between the pages via hyperlinks. The entity (e.g., an administrator for the entity) may initially access a "home" page including hyperlinks for the pages. Additionally, or alternatively, an entity (e.g., an administrator for the entity) may enter a uniform resource locator (URL) to reach each page. Pages may include, but are not limited to, a page corresponding to modifying prefix allocation or intended prefix allocation for VIF(s), a page corresponding to prefix utilization data for link(s), and a page corresponding to prefix utilization data for LAG(s). More or fewer pages may be included.

In some examples, the graphical user interface may include an area for displaying current prefix utilization status including, but not limited to, the "allowed," "allocated," "available," or "in use" states described above with respect to FIG. 2. In some examples, where the connection for a user network corresponding to the entity is a LAG, there may be separate tables reflecting the prefix utilization status for each VIF.

In some examples, the graphical user interface may include an interactive area for receipt of user input on increasing or decreasing prefix allocation for VIFs of the user network. For example, the user may be provided with a hyperlink, checkbox, or the like to request an increase in allowed prefixes for link(s) or LAG(s) associated with the entity or with a user network corresponding to the entity. As another example, the entity (e.g., an administrator for the entity) may be provided with a hyperlink, checkbox, or the like, to add or remove individual link(s) from a LAG associated with the entity, such as a LAG representing a connection to a user network corresponding to the entity.

In some examples, an interface may include an interactive area that allows an entity (e.g., an administrator for the entity) to specify creation of VIFs with an intended allocation of prefixes. Additionally, or alternatively, the interactive area may allow for updating allocation of prefixes between existing VIFs. Illustratively, the interface can include a graphical user interface that defines separate interfaces or sub-portions of an interface, for managing different types of virtual interfaces. For example, there may be different areas for managing private VIFs or public VIFs. The separate areas may be on separate pages. Alternately, the separate areas may be on the same page. For example, there may be a central area including different sections, where each section corresponds to a different type of VIF (e.g., public VIFs, private VIFs, etc.). Illustratively, one section may correspond to private VIFs. In each section, a user may view prefix utilization data for the specified type of VIF. Additionally, or alternatively, in each section, a user may modify prefix allocations or intended prefix allocations for each specified type of VIF.

At block 406, the management resources may receive the user input (e.g., from an entity or an administrator for the entity) provided through the graphical user interface. In some examples, the user input may be provided directly to the management resources. In other examples, the graphical user interface may be configured to consolidate information received from a user within a time period and provide the consolidated information to the management resources as part of a connection configuration request, as described above with respect to FIGS. 2-3. The time period may be specified by the management resources (e.g., management resource(s) 105 of FIGS. 1-3) at block 402.

At block 408, the management resource(s) may verify prefix utilization data received with the graphical user interface against operational criteria, as discussed above. If a threshold specified by the operational criteria is exceeded, the management resource(s) may generate an alert that the configuration could not be completed as specified. The alert may include an indication of which operational criteria were not met. For example, operational criteria may not be met where prefix utilization data includes an intended allocation of prefixes that are in use, and this may be indicated in the generated alert. As another example, the prefix allocation threshold for a LAG may be greater than prefix allocation threshold for an individual link. However, operational criteria may specify that prefix allocation or intended prefix allocation to an individual VIF may not exceed a value corresponding to the prefix allocation threshold for an individual link. Accordingly, operational criteria may not be met where prefix utilization data includes an intended allocation of prefixes to an individual VIF greater than the prefix allocation threshold for an individual link, and this may be indicated in the generated alert. If at least one operational criterion is not met, all criteria that are not met may be indicated in the generated alert. For example, the alert may include a listing of operational criteria that were not met.

In some examples, the management resource(s) may additionally generate recommendations on how to update an intended allocation of prefixes specified in the connection configuration request to meet operational criteria. For example, if an intended allocation of prefixes to an individual VIF is greater than the prefix allocation threshold for an individual link then the management resource(s) may generate a recommendation to reduce the number of prefixes intended for allocation to the individual VIF. The recommendation may take the form of a prompt, pop-up, or the like to reduce the number of prefixes for the individual VIF.

At block 410, the management resource(s) may update the graphical user interface, based on the verification. For example, if operational criteria are met, the management resource(s) may update prefix utilization data to indicate the updated prefix allocations or intended allocations. As another example, if operational criteria are not met, the management resource(s) may update the graphical user interface to include indication(s) of what operational criteria were not met or recommendations to meet operational criteria, as discussed above with respect to block 408.

The method 400 may end at block 412. While method 400 was described as being carried out by management resource(s) (e.g., management resource(s) 105 of FIGS. 1-3), this is not intended to be limiting. The method 400 may be carried out by other components of a connect center (e.g., connect center 104 of FIG. 1). For example, router(s) 106 of FIGS. 1-3 may carry out the method 400.

Figure 5:
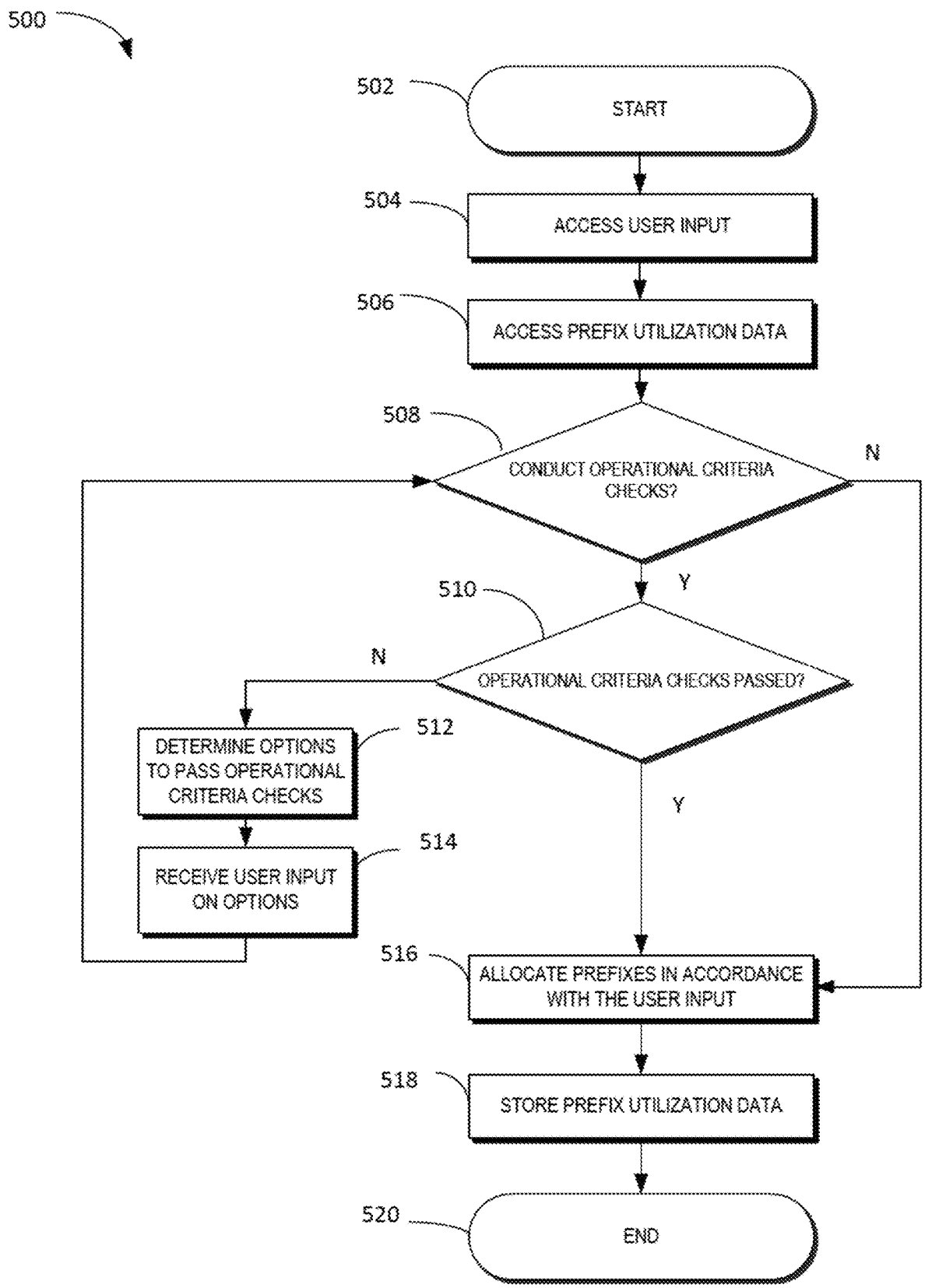
FIG. 5 illustrates an example method for management of prefix allocation for link(s) or link aggregation groups (LAGs).

FIG. 5 illustrates an example method 500 for management of prefix allocation with respect to a connection for a user network. The method 500 begins at block 502. The method 500 may be performed by management resource(s) 105 of FIGS. 1-3. As previously discussed, the management resource(s) 105 may be implemented by components of a network service provider 102 (e.g., control plane components 103), by router(s) 106, by another resource in communication with the network service provider 102, by another resource in communication with the user network (e.g., on-premises network 108, on-premises network 110, etc.), or some combination thereof. Method 500 may begin on receipt of a connection configuration request for a user network (e.g., on-premises network 108, on-premises network 110, etc.) through an authorized resource, such as computing resource 202 of FIGS. 2-3. The connection configuration request may be provided by an entity associated with the user network. Illustratively, the connection configuration request may be provided by an entity which owns or administrates the user network.

At block 504, management resource(s) 105 may access user input specifying intended prefix allocations. For example, an entity (e.g., an administrator for the entity) may provide the user input through a graphical user interface, as described above with respect to FIG. 4. Additionally, or alternatively, an entity (e.g., an administrator for the entity) may provide a connection configuration request specifying intended prefix allocations to one or more VIF(s). The user network may, for example, store the connection configuration request in a data store accessible to the management resource(s) 105, such as data store(s) 107 of FIG. 1.

As another example, management resource(s) 105 may access user input with multiple APIs. The APIs may include an API to track the number routes "allocated." In some examples, with reference to FIG. 1, an API may determine the number of "allowed" routes and provide them to management resource(s) 105. Additionally, or alternatively, the API may determine the number of "allowed" routes and provide them to router(s) 106. Additionally, or alternatively, the API may determine the number of "allowed" routes and store them in data store(s) 107. Data store(s) 107 may be accessible to management resource(s) 105 and/or router(s) 106. In some examples, the API may also return the sum of all the prefixes "allocated" and 'in use' by all the VIFs for that user network in the same call. In some examples, an API may be called to return the value of the prefixes "allocated" by the entity (e.g., an administrator for the entity) to each VIF. This API may also return the number of prefixes currently 'in use' per peer, as a VIF can have more than one BGP peer. An API may also be provided to increase the number of prefixes allocated to a user network.

In some examples, the same API may be called to perform some, or all, of the functions provided above. Additionally, or alternatively, separate APIs may be called to perform each function or subsets of the function described above. APIs may also process user input relating to prefix utilization data to determine whether operational criteria have been met, which will be discussed in more detail in block 508 below.

While block 504 describes example interfaces including a graphical user interface and one or more APIs, this is not intended to be limiting. Management resource(s) 105 may access user input through other avenues such as a command line interface or an SDK.

At block 506, the management resource(s) may access prefix utilization data, where prefix utilization data includes utilization tracking data, as discussed above with reference to FIGS. 1-3. By way of summary prefix utilization data may include, but is not limited to, the value of prefixes corresponding to an "allowed" state, the number of prefixes that corresponding to an "allocated" state, the number of prefixes corresponding to an "available" state, and the number of prefixes corresponding to an "in use" state, as described above with respect to FIG. 2. In some examples, prefix utilization data may further include, but is not limited to, intended prefix allocations to one or more VIF(s), network parameters (e.g., connection speed, network stability), or some combination thereof.

The prefix utilization data may be provided by an entity (e.g., by an administrator for the entity) through an authorized resource (e.g., computing resource 202 of FIGS. 1-3). For example, the entity may provide the prefix utilization data in a prior connection configuration request. Prefix utilization data may be stored in a data store (e.g., data store(s) 107 of FIG. 1). The prefix utilization data may be provided through several service(s), such as API(s), which may be called as prefix utilization data is modified. The APIs may provide this information to the management resource(s) (e.g., management resource(s) 105 of FIGS. 1-3). Alternately, the management resource(s) may include the APIs, which may obtain and process user input relating to prefix utilization data to determine whether operational criteria have been met, which will be discussed in more detail in blocks 508 to 512 below.

At block 508, management resource(s) may determine whether to conduct checks to verify whether operational criteria are met ("operational criteria checks" for brevity). Operational criteria checks may include, but are not limited to, determining whether a user network has sufficient prefixes "allowed" to allocate prefixes in accordance with the user input received at block 504, determining whether a user network has sufficient prefixes "available" to allocate prefixes in accordance with the user input received at block 504, determining whether a user network has sufficient prefixes available to allocate prefixes in accordance with the user input received at block 504, or determining whether prefix allocation or intended prefix allocation in accordance with the user input received at block 504 to an individual VIF exceeds a threshold corresponding to the number of allocated prefixes to an individual link.

In some examples, this determination on whether to conduct operational criteria checks may be based on a trust level for the entity or for the user network corresponding to the entity. The management resource(s) may determine this trust level from a unique identifier representing the entity or the user network corresponding to the entity. For example, the unique identifier may correspond with a trust level. The trust level may determine how many operational criteria checks are conducted. For example, for an entity with a high trust level, the management resource(s) might not conduct checks. As another example, for an entity with a high trust level, the management resource(s) might request user input (e.g., through a graphical user interface) as to which operational criteria checks to conduct. For an entity with a medium trust level, the management resource(s) may conduct a reduced number of checks. For example, the management resource(s) may not conduct checks on network parameters (e.g., connection speed, connection stability, etc.) of the connection (e.g., link(s), LAG(s), etc.) for the user network corresponding to the entity. Alternately, the management resource(s) might request user input (e.g., through a graphical user interface) as to whether to conduct omitted checks, such as network parameter checks. For an entity with a low trust level, the management resource(s) may conduct all operational criteria checks.

If the management resource(s) determines not to conduct operational criteria checks, the management resource(s) may proceed to allocate prefixes in accordance with the user input at block 516. However, if the management resource(s) determines to conduct at least some operational criteria checks, the management resource(s) may proceed to block 510, to determine whether the operational criteria checks have passed. As part of determining whether operational criteria checks have passed, management resource(s) 105 may determine whether there are a sufficient number of available prefixes to implement the allocation in accordance with the user input received at block 504.

Note that operational criteria checks may be conducted through other avenues, such as command line interfaces or SDKs. Operational criteria checks may also be conducted with APIs, as discussed with reference to block 504 above. For example, management resource(s) 105 may also use APIs to allow the input on the creation or modification of VIFs. For example, an API may process an intended prefix allocation at the moment of creation of a VIF to determine whether operational criteria are met. For example, if the connection's 'available' pool of prefixes has enough prefixes remaining and the requested allocation for the new VIF is within that limit, the VIF will be created with the specified prefixes. However, if the prefix value is larger than the remaining routes in the connection's "available" pool, the customer may receive a specific error (e.g., "Prefix allocation or intended prefix allocation for new VIF exceeds the number of prefixes available").

An API may also be called to allow an entity (e.g., an administrator of the entity) to increase/reduce the number of prefixes that may be allocated to a particular VIF for a specified connection. When increasing the number of prefixes that may be allocated to a particular VIF, the API may determine whether the connection's 'available' pool of prefixes has enough prefixes remaining. If the requested allocation of prefixes for the VIF is within that limit, the prefixes will be added to the VIF in accordance with the with the requested allocation. However, if the number of prefixes allocated or intended to be allocated is larger than the remaining routes in the connection's 'available' pool, the customer may receive a specific error (e.g., "Updated prefix allocation or intended prefix allocation with respect to the VIF exceeds the number of prefixes left").

When decreasing a number of prefixes for a specific VIF, an operational criteria check may be performed on the number of prefixes 'in use' by the specific VIF. The operational criteria may indicate that an intended update to prefix allocation to a VIF may not be lower than the number of prefixes currently 'in use' by the VIF. For example, an administrator for the connect center may determine that a routing session (e.g., a BGP session) may fail if the number of prefixes allocated is higher than is available, and the operational criteria may be set to mitigate the risk of the routing session failing.

If the operational criteria corresponding to the number of prefixes 'in use' by the specific VIF is not met, the entity (e.g., an administrator for the entity) may receive a specific error (e.g., cannot decrease prefixes for VIF, prefixes currently advertised for VIF exceed the requested amount"). If the value of the new allocation is larger than the number of prefixes currently in use by the specific VIF, the change may be accepted, and the connection's pool of "available" prefixes may increase by the number of prefixes by which the specific VIF was decreased.

Additionally, or alternatively, APIs may be provided that are specific to LAGs. For example, an API may be called to describe the combined pool of all underlying links of the LAG. As another example, an API may be called to add a link to the LAG. The API may add the new link's allocation of prefixes to the LAG's pool of allocated prefixes. As a further example, an API may be provided to delete a link associated with a LAG and/or disassociate a link from a LAG: When deleting or disassociating a link from the LAG, the total number of 'in use' prefixes by all VIFs in the LAG may not be higher than the new "allowed" pool for the LAG if the link was deleted/disassociated. In this case, the entity (e.g., an administrator for the entity) may not be allowed to delete the link and may receive specific error (e.g., "the link may not be deleted"). The entity (e.g., an administrator for the entity) may also be provided with a recommendation to correct the error (e.g., reduce number of "in use" prefixes).

In addition, an API may be called for management of operational criteria corresponding to the number of resources which may be in an "allowed" pool for the LAG. For example, an administrator may set an operational criterion for limiting the "allowed" pool for a LAG. This operational criterion may be based on characteristics of routing resource(s) at the connect center, such as overall usage by different user networks. The limit may be equivalent to an upper limit for intended prefix allocation for two links. In one example, the upper limit for intended prefix allocation for one link may be five thousand, and the upper limit for intended prefix allocation may be ten thousand for a LAG that includes two or more links. Additionally, or alternatively, APIs may also be provided to manage prefix utilization updates for a LAG. For example, an API may be provided to increase an "allowed" number of prefixes corresponding to connections for specific user networks. As another example, an API may be provided to increase a threshold relating to "allocation" of prefixes to VIF(s). The API may be called on selection of a hyperlink, where the hyperlink is accessible only to authorized resources, where the authorized resources are associated with unique identifiers for an entity, for a user network corresponding to the entity, the like, or some combination thereof. The hyperlink may be provided through the graphical user interface described in FIG. 4. An API may also be called to limit when prefixes may be added to an "allowed" pool for a LAG. For example, the API may allow for a delay (e.g., 90 days) between addition of a link to a LAG and addition of the allocated prefixes for that link to the "allocated" pool for the LAG.

In some examples, an API may be provided to manage operational criteria for a LAG of an upper limit of prefixes which may be allocated to a VIF supported by the LAG. Illustratively, an administrator for the management resource(s) 105 may determine that advertisement of more than a number of prefixes equivalent to the number of prefixes that can be allocated to an individual link of the LAG may increase the risk of failure of a routing session. The administrator for the management resource(s) 105 may accordingly set an operational criterion including an upper limit of prefixes which may be allocated to a VIF. This operational criterion may be specific to connections including LAG(s).

In some examples, the same API may be called to perform some, or all, of the functions provided above. Additionally, or alternatively, separate APIs may be called to perform each function or subsets of the functions described above.

Returning to block 510, management resource(s) may determine whether the entity or user network corresponding to the entity has sufficient available resources with respect to a connection to allocate prefixes in accordance with the user input received at block 506. The management resources may make this determination with one or more APIs, as discussed above with reference to block 508. For example, a user network may have an allowed number of prefixes based on the connection between the user network and the connect center 104, as discussed above with reference to FIG. 2. Some of these allocated prefixes may be "in use," as discussed above with respect to FIG. 2. For example, the entity (e.g., an administrator for the entity) previously allocated prefixes, and these allocated prefixes may be considered to be in use. Alternately, prefixes may be "in use" when actively being used for routing. "In use" prefixes may not be available for an entity to specify an intended allocation to one or more VIF(s). If user input at block 504 specifies an intended allocation of prefixes that specifies more prefixes than are available, the management resource(s) may determine that the intended prefix allocation received at block 504 do not meet operational criteria.

As another example of an operational criteria check, management resource(s) may determine whether each virtual interface (VIF) has sufficient available prefixes. The management resources may make this determination with one or more APIs, as discussed above with reference to block 508. This operational criteria check may occur prior to or subsequent to a determination of whether the entity or user network corresponding to the entity has sufficient available resources with respect to a connection to allocate prefixes in accordance with an intended allocation of prefixes. In some aspects, the management resource(s) may not determine whether each virtual interface (VIF) has sufficient available prefixes. For example, where the connection is associated with an individual link and not associated with a LAG, the management resource(s) may not determine whether each virtual interface (VIF) has sufficient available prefixes. Alternately, the management resource(s) may determine whether each virtual interface (VIF) has sufficient available prefixes prior to or subsequent to other operational criteria checks. These may include, but are not limited to, determining whether a connection has sufficient "allowed" prefixes to allocate prefixes in accordance with the user input received at block 506 or determining whether a user network has sufficient prefixes available to allocate prefixes in accordance with the user input received at block 504.

If one or more operational criteria checks fail, management resource(s) may proceed to block 512 to determine options that may be implemented to cause the operational criteria checks to pass. As discussed in FIG. 3 at [4], such options may include options for corrective actions, such as generation of a selectable link requesting input on reallocating the "in use" prefixes to existing VIFs.

At block 514, the management resource(s) may receive user input on the options for corrective actions, such as generation of a selectable link requesting input on reallocating the "in use" prefixes to existing VIFs. The management resource(s) may provide a user with the options through a command line interface, an SDK, one or more APIs, or the like. In one example, the management resource(s) may present the options to a user for a user network through selectable links on a graphical user interface. The user, through computing resource 202, may then select the link indicating that they would like to reallocate the prefixes and remove the VIFs they were in previously per the connection configuration request. The management resource(s) may proceed accordingly to reallocate the prefixes.

After reallocation, the management resource(s) may return to block 508 to determine whether to conduct operational criteria checks. For example, if a user selects an option at block 514, the management resource(s) may consider that the operational criteria check failure has been resolved and proceed to distribute prefixes at block 516 in accordance with the user input received at block 504. Alternately, the management resource(s) may proceed to block 510 to determine whether operational criteria checks now pass after application of the selected option. If so, the management resource(s) may proceed to block 516 to distribute prefixes in accordance with user input received at block 504.

At block 516, the management resource(s) may allocate prefixes to one or more VIF(s) in accordance with the user input received at block 504. The management resource(s) may distribute prefixes to one or more VIF(s) in accordance with the intended prefix allocation specified in the user input and later verified through operational criteria checks.

At block 518, management resource(s) may store the prefix utilization data. The management resource(s) may generate additions or updates to update existing data structures to match the allocation. For example, at block 516, management resource(s) may store prefix utilization data in data store(s) accessible to VIF(s) of a user interface. Prefix utilization data may include, but is not limited to, prefix utilization status and intended prefix allocations.

Data store(s) (e.g., data store(s) 107 of FIG. 1) may include a listing of allocated prefixes or prefixes intended to be allocated to each VIF for a connection. There may be a separate table for each VIF, where each row indicates an allocated prefixes or prefixes intended to be allocated. Alternately, there may be a combined table for VIFs of the user network. Each column of the table may represent a VIF, and each row of the table may indicate allocated prefixes or prefixes intended to be allocated to the VIFs. Alternately, each row of the table may represent a VIF, and each column of the table may indicate allocated prefixes or prefixes intended to be allocated to the VIFs. The table may be modified to match the intended prefix allocations in the user input received at block 506. For example, if the user input adds a VIF with allocated prefixes or prefixes intended to be allocated, a new column may be added with the allocated prefixes or prefixes intended to be allocated. As another example, if the user input removes a VIF, a column can be removed from the table. If allocated prefixes or prefixes intended to be allocated are added or removed for an existing VIF, then rows including allocated prefixes or prefixes intended to be allocated may be added or removed from the column corresponding to the VIF.

As another example, management resource(s) may store prefix utilization data in data store(s) accessible to routing resources (e.g., router(s) 106 of FIG. 1). The data store(s) may be internal to the router(s). Alternatively, the data store(s) may be external to the router(s), such as data store(s) 107 of FIG. 1. The data stores may include a separate table for each VIF of a user network, where each row indicates a prefix intended for allocation to the specified VIF. Alternately, there may be a combined table for VIFs of the user network. Each column of the table may represent a VIF, and each row of the table may indicate prefixes intended for allocation to the specified VIF. Alternately, each row of the table may represent a VIF, and each column of the table may indicate intended prefix allocations to the VIF. The table may be modified to match the intended prefix allocations in the user input received at block 506. For example, if the user input adds a VIF with intended prefix allocations, then a new column may be added with the intended prefix allocations. As another example, if the user input removes a VIF, a column can be removed from the table. If intended prefix allocations are added or removed for an existing VIF, then rows including intended prefix allocations may be added or removed from the column corresponding to the VIF. The routing resource(s) may access the prefix utilization data to configure advertisement of the allocated prefixes for each VIF. In some examples, the routing resource(s) may also access the prefix utilization data to generate routing tables. Additionally, or alternatively, the routing resource(s) may also access the prefix utilization data to implement routing tables generated by an external service, such as a route generation service of the network service provider 102 of FIG. 1.

The routine ends at block 520. While method 500 was described as being carried out by management resource(s) (e.g., management resource(s) 105 of FIGS. 1-3), this is not intended to be limiting. As another example, router(s) 106 of FIG. 1 may carry out the method 500 and provide feedback to the management resource(s), as discussed in FIGS. 2-3.

Figure 6:
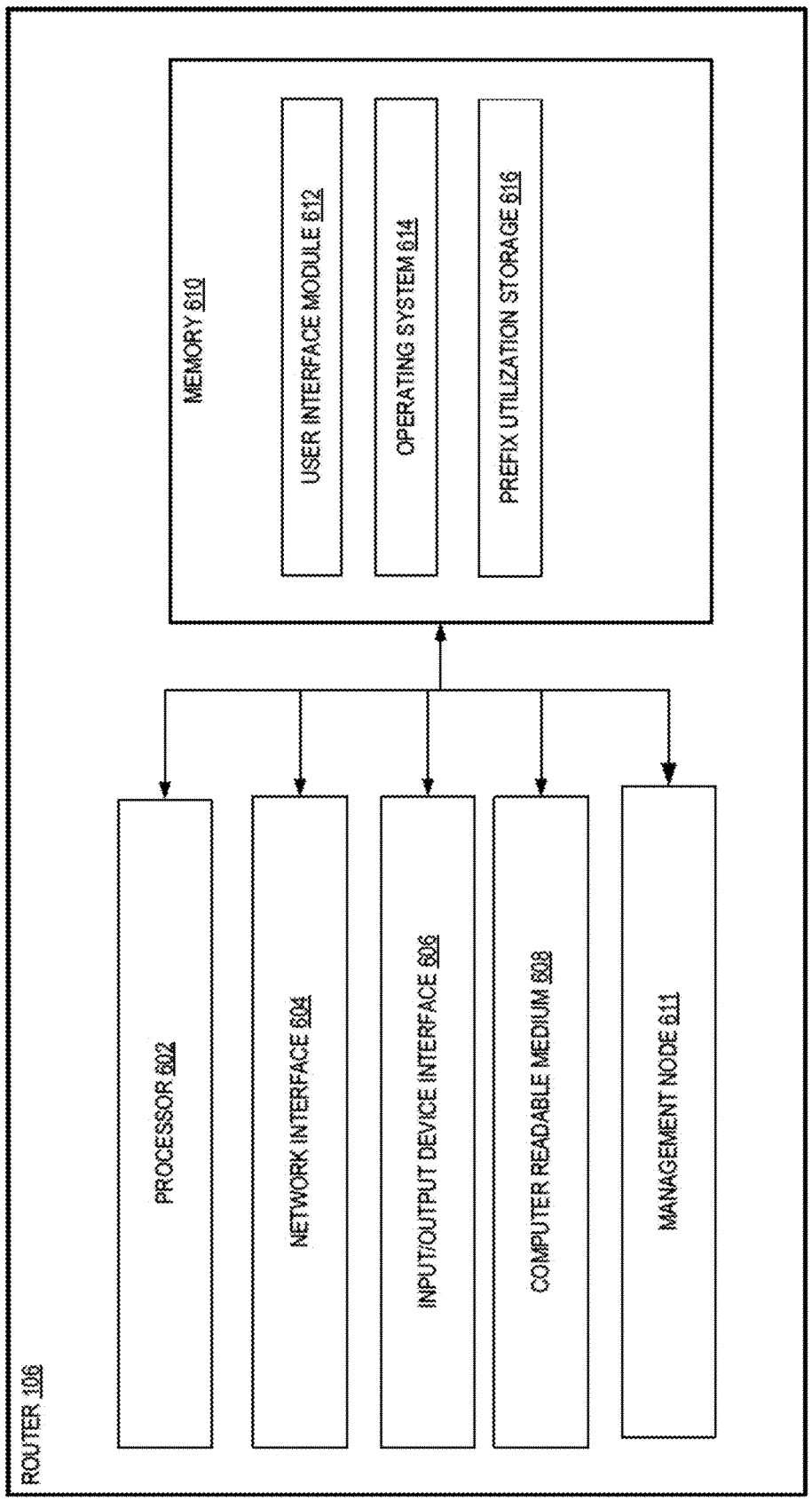
FIG. 6 depicts a general architecture of a router including an arrangement of computer hardware and software that may be used to implement aspects of the present disclosure.

FIG. 6 depicts a general architecture of a router 106 including an arrangement of computer hardware and software that may be used to implement aspects of the present disclosure. The hardware may be implemented on physical electronic devices, as discussed in greater detail below. A router 106 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIG. 1.

As illustrated, the router 106 includes a processor 602, a network interface 604, a memory 610, all of which may communicate with one another by way of a communication bus. The network interface 604 may provide connectivity to one or more networks or computing systems. The processor 602 may thus receive information and instructions from other computing systems or services, such as network service provider 102, an entity, or a user network (e.g., on-premises network 108, on-premises network 110, etc.) corresponding to the entity. The processor 602 may also communicate to and from memory 610 and further provide output information for an optional display (not shown) via the input/output device interface 606. The input/output device interface 606 may also accept input from an optional input device (not shown).

The computer-readable medium drive 608 can be used to provide a direct connection to the router 106. This connection can be used to communicate with the router 106 and/or provide maintenance for the router 106.

Memory 610 may contain computer program instructions (grouped as units in some examples) that the processor 602 executes in order to implement one or more aspects of the present disclosure. Memory 610 correspond to one or more tiers of memory devices, including (but not limited to) RAM, 3D XPOINT memory, flash memory, magnetic storage, and the like.

The memory 610 may store an operating system 614 that provides computer program instructions for use by the processor 602 in the general administration and operation of the router 106. Memory 610 may further include computer program instructions and other information for implementing aspects of the present disclosure. For example, the memory 610 may include a user interface module 612 that generates user interfaces (or instructions therefor) for display upon a computing device, e.g., via a navigation or browsing interface such as a browser or application installed on the computing device. In some examples, the processor 602 may access instructions from the user interface module 612 to generate the display. In some examples, user input may be received through the display, as discussed above with reference to FIG. 5.

Memory 610 may also include a prefix utilization storage 616. Management node 611 may access prefix utilization storage to carry out the operations of FIGS. 2-5 above.

The router 106 of FIG. 6 is one illustrative configuration of such a device, of which others are possible. For example, while shown as a single device, router 106 may in some examples be implemented as multiple physical host devices.

Figure 7:
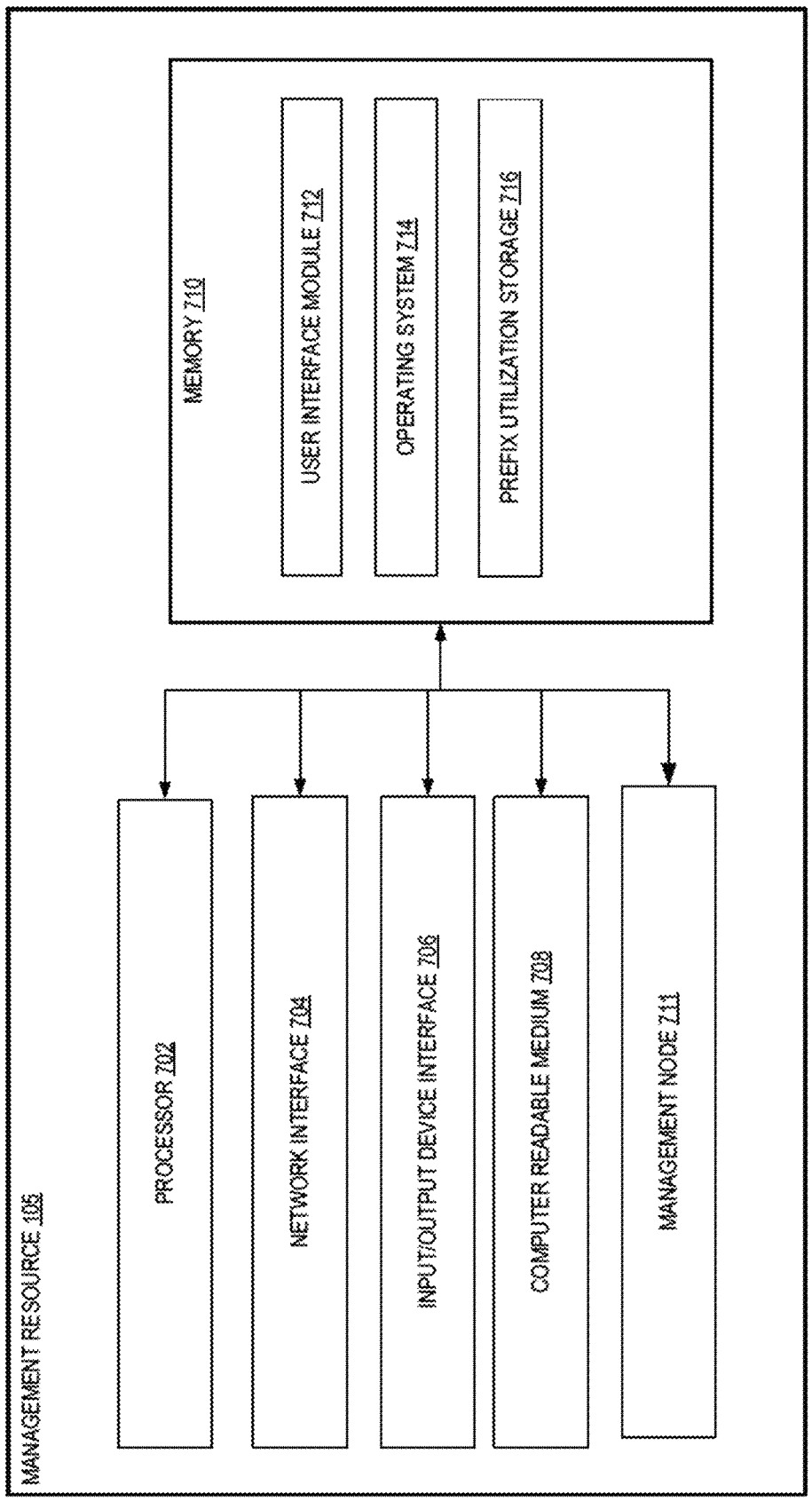
FIG. 7 depicts a general architecture of a management resource including an arrangement of computer hardware and software that may be used to implement aspects of the present disclosure.

FIG. 7 depicts a general architecture of a management resource 105 including an arrangement of computer hardware and software that may be used to implement aspects of the present disclosure. The hardware may be implemented on physical electronic devices, as discussed in greater detail below. A management resource 105 may include many more (or fewer) elements than those shown in FIG. 7. It is not necessary, however, that all of these generally conventional elements be shown in order to provide an enabling disclosure. Additionally, the general architecture illustrated in FIG. 7 may be used to implement one or more of the other components illustrated in FIG. 1.

As illustrated, the management resource 105 includes a processor 702, a network interface 704, a memory 710, all of which may communicate with one another by way of a communication bus. The network interface 704 may provide connectivity to one or more networks or computing systems. The processor 702 may thus receive information and instructions from other computing systems or services, such as network service provider 102, an entity, or a user network (e.g., on-premises network 108, on-premises network 110, etc.) corresponding to the entity. Information and instructions from an entity be provided through an authorized resource for the entity, such as computing resource 202 of FIGS. 2-3. The processor 702 may also communicate to and from memory 710 and further provide output information for an optional display (not shown) via the input/output device interface 706. The input/output device interface 706 may also accept input from an optional input device (not shown).

The computer-readable medium drive 708 can be used to provide a direct connection to the management resource 105. This connection can be used to communicate with the management resource 105 and/or provide maintenance for the management resource 105.

The memory 710 may contain computer program instructions (grouped as units in some examples) that the processor 702 executes in order to implement one or more aspects of the present disclosure. Memory 710 correspond to one or more tiers of memory devices, including (but not limited to) RAM, 3D XPOINT memory, flash memory, magnetic storage, and the like.

The memory 710 may store an operating system 714 that provides computer program instructions for use by the processor 702 in the general administration and operation of the management resource 105. Memory 710 may further include computer program instructions and other information for implementing aspects of the present disclosure. For example, the memory 710 may include a user interface module 712 that generates user interfaces (or instructions therefor) for display upon a computing device, e.g., via a navigation or browsing interface such as a browser or application installed on the computing device. In some examples, the processor 702 may access instructions from the user interface module 712 to generate the display. In some examples, user input may be received through the display, as discussed above with reference to FIG. 5.

Memory 710 may also include a prefix utilization storage 716. Management node 711 may access prefix utilization storage to carry out the operations of FIGS. 2-5 above.

The management resource 105 of FIG. 7 is one illustrative configuration of such a device, of which others are possible. For example, while shown as a single device, management resource 105 may in some examples be implemented as multiple physical host devices.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some examples, the computer system may be a cloud-based computing system whose processing resources are shared by multiple distinct business entities or other users.

Depending on the example, certain acts, events, or functions of any of the processes or algorithms described herein can be performed in a different sequence, can be added, merged, or left out altogether (e.g., not all described operations or events are necessary for the practice of the algorithm). Moreover, in certain examples, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the examples disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the examples disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another example, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the examples disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without other input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense)

so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various examples, it can be understood that various omissions, substitutions, and changes in the form and details of the devices or algorithms illustrated can be made without departing from the spirit of the disclosure. As can be recognized, certain examples described herein can be embodied within a form that does not provide all of the features and benefits set forth herein, as some features can be used or practiced separately from others. The scope of certain examples disclosed herein is indicated by the appended claims rather than by the foregoing description. All changes which come within the meaning and range of equivalency of the claims are to be embraced within their scope.

What is claimed is:

1. A system comprising:
   a network service provider comprising a first plurality of compute components and a first plurality of gateway components, the network service provider including a data store; and
   a connect center, the connect center comprising:
      a plurality of routing resources; and
      one or more management resources, programmed by executable instructions to at least:
         access a connection configuration request for a user network, wherein the connection configuration request includes a request to create one or more virtual interfaces and an intended allocation of prefixes to each virtual interface, wherein the intended allocation for each virtual interface comprises a subset of prefixes of a plurality of prefixes, and wherein each prefix of the plurality of prefixes includes one or more network addresses;
         access the first data store, wherein the first data store includes utilization tracking data for prefix availability with respect to the user network;
         based on the utilization tracking data, verify that the intended allocation of prefixes to the one or more virtual interfaces meets at least one operational criterion by determining whether a sum of prefixes intended to be allocated to the one or more virtual interfaces is within a threshold number of prefixes available to the user network;
         based on the verification, provide routing parameters to the plurality of routing resources specifying advertisement of prefixes to the network service provider in accordance with the intended allocation of prefixes in the configuration request; and
         update the utilization tracking data in the first data store to reflect the advertisement of prefixes.

2. The system of claim 1, wherein the one or more management resources are included in at least one of the network service provider or the plurality of routing resources.

3. The system of claim 1, wherein the utilization tracking data includes prefix utilization data, wherein prefix utilization data indicates whether the routing resources are available or in use.

4. The system of claim 3, wherein the threshold number of prefixes available to the user network is based on at least one of prefix utilization data, user input, or network parameters,
   wherein user input comprises a selection of a prefix allocation level, and
   wherein network parameters comprise at least one of connection speed between the user network or connection stability.

5. The system of claim 1, wherein the connection configuration request comprises a request to create a link aggregation group,
   wherein the link aggregation group includes one or more connections,
   wherein each of the one or more connections is associated with a number of prefixes,
   wherein the link aggregation group is associated with the sum of the prefixes associated with each of the one or more connections, and
   the threshold number of prefixes available to the user network is based on the sum of the prefixes.

6. The system of claim 5, wherein the threshold number of prefixes available to the user network is additionally based on at least one of prefix utilization data, user input, or network parameters,
   wherein the utilization tracking data includes prefix utilization data,
   wherein prefix utilization data indicates whether the routing resources are available or in use,
   wherein user input comprises a selection of a prefix allocation level, and
   wherein network parameters comprise at least one of connection speed between the user network or connection stability.

7. A method comprising:
   accessing a connection configuration request for a user network, wherein the connection configuration request specifies a planned routing method for communication between the user network and a network service provider, wherein the connection configuration request includes a plurality of prefixes, and wherein each prefix of the plurality of prefixes includes one or more network addresses;

accessing a first data store, wherein the first data store includes utilization tracking data for prefix availability with respect to the user network and wherein the utilization tracking data is updated after each allocation of prefixes; and based on the utilization tracking data and the connection configuration request, verifying at least one operational criterion is met for a plurality of routing resources by determining whether an intended allocation of prefixes to one or more virtual interfaces is within a threshold number of prefixes available to the user network.

8. The method of claim 7, wherein determining whether an intended allocation of prefixes is within a threshold number of prefixes available to the user network comprises:

generating a routing session including a first advertisement of prefixes in accordance with the allocation of prefixes;

determining that the routing session is established; and based on the determination that the routing session is established, determine that the intended allocation of prefixes is within a threshold number of prefixes available to the user network.

9. The method of claim 7, wherein determining whether the intended allocation of prefixes is within a threshold number of prefixes available to the user network comprises:

determining the number of prefixes available to the user network, where the number of prefixes available to the user network is a difference between a number of prefixes allocated to a user network and a number of prefixes in use by the user network, wherein the number of prefixes allocated to the user network comprises an upper limit on the number of prefixes which may be allocated by the user network to one or more virtual interfaces, and wherein the number of prefixes in use by the user network, wherein prefixes are in use when actively used in routing data between the user network and the network service provider; and determining that the number of prefixes in the intended allocation of prefixes is less than the number of prefixes available to the user network.

10. The method of claim 7, further comprising:

accessing a second configuration request from a user network;

determining that the intended allocation of prefixes is outside the threshold;

generating an alert that the intended allocation of prefixes is outside the threshold; and outputting the alert to the user network.

11. The method of claim 10, wherein generating an alert includes generating recommendations for corrective actions to achieve compliance with the threshold, and wherein corrective actions include:

increasing a number of virtual interfaces specified in the second configuration request, wherein the intended allocation of prefixes distributes a subset of the plurality of prefixes to each virtual interface, reducing the number of prefixes included in the intended allocation of prefixes for at least one virtual interface, or increasing the number of prefixes included in the intended allocation of prefixes for at least one virtual interface.

12. The method of claim 7, further comprising advertising prefixes with one or more virtual interfaces based on the intended allocation of prefixes, wherein the one or more virtual interfaces are in communication with a plurality of routing resources and the network service provider.

13. The method of claim 7, further comprising:

generating an alert when overall prefix advertisement with a first routing resource exceeds a threshold, wherein the first routing resource advertises prefixes associated with a plurality of user networks; and in response to the alert, reallocating prefix advertisement between a first and a second routing resource.

14. The method of claim 7, further comprising determining a prefix utilization data for the user network, wherein determining the prefix utilization data comprises:

determining a number of prefixes of the plurality of prefixes allowed for a connection corresponding to the user network, wherein the number of prefixes allowed for a connection corresponding to the user network corresponds to a first status value;

determining a number of prefixes of the plurality of prefixes previously allocated to a virtual interface of a plurality of virtual interfaces for the user network, wherein the number of prefixes previously allocated to a virtual interface of a plurality of virtual interfaces for the user network corresponds to a second status value;

determining a number of prefixes of the plurality of prefixes in use by the user network, wherein prefixes are in use during advertisement by a plurality of routing resources, wherein the number of prefixes in use by the user network corresponds to a third status value; and determining a number of prefixes available to be allocated by the user network based on the first status value and the second status value, wherein the number of prefixes available to be allocated by the user network corresponds to a fourth status value.

15. A non-transitory, computer-readable medium comprising computer-executable instructions, wherein the computer-executable instructions, when executed by a computer system, cause the computer system to:

provide an interface configured to receive user input specifying configuration of one or more virtual interfaces for a user network, wherein the user input comprises an intended allocation for each virtual interface of a subset of prefixes of a plurality of prefixes, and wherein each prefix of the plurality of prefixes includes one or more network addresses;

receive user input specifying configuration of one or more virtual interfaces with an intended allocation of prefixes, wherein the intended allocation of prefixes comprises an intended allocation for each virtual interface of a subset of prefixes of a plurality of prefixes, and wherein each prefix of the plurality of prefixes includes one or more network addresses;

based on the user input, generate a connection configuration request; and provide the connection configuration request to a connect center, wherein the connect center is configured to verify the connection configuration request is within a first threshold, wherein the first threshold specifies a number of prefixes available for allocation.

16. The non-transitory, computer-readable medium of claim 15, comprising further computer-executable instructions that, when executed by a computer system, cause the computer system to:

provide a first interactive area configured to receive user input comprising selection of a request to increase an amount of prefixes allocated to the user network;

receive a user input through the first interactive area comprising selection of the request to increase the number of prefixes available for allocation; and based on the request, increase the number of prefixes available for allocation.

17. The non-transitory, computer-readable medium of claim 15, wherein the connect center is configured to verify the connection configuration request against a plurality of thresholds.

18. The non-transitory, computer-readable medium of claim 15, comprising further computer-executable instructions that, when executed by a computer system, cause the computer system to:

receive user input specifying a configuration of a first virtual interface with an intended allocation of an amount of prefixes greater than the first threshold;

receive an alert from the connect center indicating the configuration could not be completed, wherein the alert indicates that the first threshold has been exceeded; and based on the alert, prompt user to update the connection configuration request.

19. The non-transitory, computer-readable medium of claim 15, comprising further computer-executable instructions that, when executed by a computer system, cause the computer system to provide a second interactive area configured to receive user input relating to prefix allocation for link aggregation groups.

20. The non-transitory, computer-readable medium of claim 15, comprising further computer-executable instructions that, when executed by a computer system, further cause the computer system to:

receive user input allocating prefixes to one or more virtual interfaces associated with a link aggregation group in the link aggregation group;

receive an alert from the connect center indicating that the configuration indicating the configuration could not be completed, wherein the alert indicates that a second threshold has been exceeded for at least one virtual interface included in the connection configuration request, wherein the second threshold specifies a number of prefixes per virtual interface; and provide a prompt to update the connection configuration request.

* * * * *